United States Patent
Cox

(10) Patent No.: US 11,725,151 B2
(45) Date of Patent: *Aug. 15, 2023

(54) SYSTEMS AND METHODS FOR ENHANCED INORGANIC CONTAMINANT REMOVAL FROM HYDROCARBON FEEDSTOCK

(71) Applicant: MARATHON PETROLEUM COMPANY LP, Findlay, OH (US)

(72) Inventor: Mark D. Cox, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,084

(22) Filed: May 6, 2022

(65) Prior Publication Data

US 2022/0275290 A1 Sep. 1, 2022

Related U.S. Application Data

(63) Continuation of application No. 17/687,661, filed on Mar. 6, 2022, now Pat. No. 11,352,570, which is a (Continued)

(51) Int. Cl.
*C10G 31/08* (2006.01)
*C10G 31/06* (2006.01)
(Continued)

(52) U.S. Cl.
CPC .............. *C10G 31/08* (2013.01); *B01D 17/02* (2013.01); *C02F 1/04* (2013.01); *C02F 1/48* (2013.01);
(Continued)

(58) Field of Classification Search
CPC .. C10G 31/06; C10G 31/08; C10G 2300/205; C10G 2300/4006; C10G 2300/4012; C02F 1/441; C02F 1/74; C02F 9/00
See application file for complete search history.

(56) References Cited

U.S. PATENT DOCUMENTS 4,904,383 A 2/1990 Auerswald
7,244,364 B1 7/2007 Weber
(Continued)

FOREIGN PATENT DOCUMENTS

| CN | 103627433 | 3/2014 |
|---|---|---|
| WO | 2006005085 | 1/2005 |
| WO | 2014066396 | 5/2014 |

OTHER PUBLICATIONS

Pathak et al., Chapter 9: Feedstock Transportation, Agricultural Processing, Logistic from Farm to Bio-refinery: Recent Developments, Mechanization, and Cost Analysis in Sustainable Biofuels Development in India, Chandal, Sukumaran, Springer, 2017, pp. 207-221.

(Continued)

*Primary Examiner* — Brian A McCaig
(74) *Attorney, Agent, or Firm* — Womble Bond Dickinson (US) LLP

(57) ABSTRACT

Systems and methods to enhance the removal of inorganic contaminants, including metals, from hydrocarbon feedstocks at a refinery. One or more embodiments of such systems and methods may be used to provide a renewable hydrocarbon feedstock having a reduced amount of metal contaminants. The reduction of metal contaminants in the renewable hydrocarbon feedstock mitigates catalyst fouling and/or deactivation during downstream refinery processing of the renewable hydrocarbon feedstock.

27 Claims, 17 Drawing Sheets

US 11,725,151 B2

Page 2

Related U.S. Application Data continuation of application No. 17/452,678, filed on Oct. 28, 2021, now Pat. No. 11,306,260.

(60) Provisional application No. 63/198,960, filed on Nov. 25, 2020, provisional application No. 63/198,937, filed on Nov. 24, 2020, provisional application No. 63/198,606, filed on Oct. 29, 2020.

(51) Int. Cl.
| | |
|---|---|
| *C02F 9/00* | (2023.01) |
| *B01D 17/02* | (2006.01) |
| *C02F 1/04* | (2023.01) |
| *C02F 1/48* | (2023.01) |
| *C02F 1/44* | (2023.01) |
| *C02F 1/74* | (2023.01) |
| *B01D 17/06* | (2006.01) |
| *C02F 1/02* | (2023.01) |
| *C02F 1/00* | (2023.01) |
| *C02F 101/10* | (2006.01) |
| *C02F 101/20* | (2006.01) |
| *C02F 103/32* | (2006.01) |
| *C02F 103/36* | (2006.01) |
| *C10G 9/06* | (2006.01) |

(52) U.S. Cl.
CPC ............... *C02F 9/00* (2013.01); *C10G 31/06* (2013.01); *B01D 17/06* (2013.01); *C02F 1/02* (2013.01); *C02F 1/441* (2013.01); *C02F 1/74* (2013.01); *C02F 2001/007* (2013.01); *C02F 2101/105* (2013.01); *C02F 2101/20* (2013.01); *C02F 2103/322* (2013.01); *C02F 2103/365* (2013.01); *C02F 2209/001* (2013.01); *C02F 2209/02* (2013.01); *C02F 2209/44* (2013.01); *C10G 9/06* (2013.01); *C10G 2300/205* (2013.01); *C10G 2300/4006* (2013.01); *C10G 2300/4012* (2013.01)

(56) References Cited

U.S. PATENT DOCUMENTS

| | | |
|---|---|---|
| 7,872,054 B2 | 1/2011 | Cortright et al. |
| 7,989,664 B2 | 8/2011 | Cortright |
| 8,017,818 B2 | 9/2011 | Cortright et al. |
| 8,192,628 B2 | 6/2012 | Cranford et al. |
| 8,231,857 B2 | 7/2012 | Cortright et al. |
| 8,273,138 B2 | 9/2012 | Bauldreay et al. |
| 8,350,108 B2 | 1/2013 | Cortright et al. |
| 8,466,330 B2 | 6/2013 | Bauldreay et al. |
| 8,642,813 B2 | 2/2014 | Qiao et al. |
| 8,697,924 B2 | 4/2014 | Bauldreay et al. |
| 8,710,281 B2 | 4/2014 | Nagaki et al. |
| 8,784,645 B2 | 7/2014 | Iguchi et al. |
| 8,834,587 B2 | 9/2014 | Cortright et al. |
| 8,962,902 B2 | 2/2015 | Blommel et al. |
| 9,206,366 B2 | 12/2015 | Bauldreay et al. |
| 9,314,778 B2 | 4/2016 | Blank et al. |
| 9,453,169 B2 | 9/2016 | Stippich, Jr. et al. |
| 9,593,054 B2 | 3/2017 | Kania et al. |
| 9,656,937 B2 | 5/2017 | Held et al. |
| 9,725,777 B2 | 8/2017 | Qiao et al. |
| 9,765,261 B2 | 9/2017 | Qiao et al. |
| 9,862,893 B2 | 1/2018 | Gray et al. |
| 9,873,836 B2 | 1/2018 | Blommel et al. |
| 9,873,837 B2 | 1/2018 | Qiao et al. |
| 9,878,966 B2 | 1/2018 | Blommel et al. |
| 9,988,585 B2 | 6/2018 | Hayasaka et al. |
| 10,005,700 B2 | 6/2018 | Beck et al. |
| 10,071,322 B2 | 9/2018 | Coppola et al. |
| 10,370,596 B2 | 8/2019 | Blommel et al. |
| 10,975,319 B2 | 4/2021 | Price et al. |
| 11,130,914 B2 | 9/2021 | Blommel et al. |
| 11,306,260 B1 | 4/2022 | Cox |
| 11,613,715 B1 | 3/2023 | Womeldorff et al. |
| 2012/0280175 A1 | 11/2012 | Kania et al. |
| 2012/0323053 A1 | 12/2012 | Qiao et al. |
| 2013/0019859 A1 | 1/2013 | Qiao et al. |
| 2013/0023702 A1 | 1/2013 | Qiao et al. |
| 2013/0036660 A1 | 2/2013 | Woods et al. |
| 2013/0043192 A1 | 2/2013 | Smith et al. |
| 2014/0187828 A1 | 7/2014 | Bauldreay et al. |
| 2014/0350317 A1 | 11/2014 | Blommel et al. |
| 2015/0165488 A1 | 6/2015 | Powell et al. |
| 2015/0183701 A1 | 7/2015 | Blank et al. |
| 2015/0315055 A1 | 11/2015 | Chidambaran et al. |
| 2016/0115432 A1 | 4/2016 | Dahiya |
| 2016/0214028 A1 | 7/2016 | Coppola |
| 2016/0326448 A1 | 11/2016 | Bauldreay et al. |
| 2016/0362756 A1 | 12/2016 | Qiao et al. |
| 2017/0044443 A1 | 2/2017 | Blommel et al. |
| 2020/0048569 A1 | 2/2020 | Karvo et al. |
| 2020/0172817 A1 | 6/2020 | Davidson et al. |
| 2021/0009911 A1 | 1/2021 | Medoff |
| 2022/0041939 A1 | 2/2022 | Tiitta et al. |
| 2022/0135449 A1 | 5/2022 | Cantley et al. |
| 2023/0072588 A1 | 3/2023 | Blommel et al. |
| 2023/0122414 A1 | 4/2023 | Blommel et al. |
| 2023/0125062 A1 | 4/2023 | Blommel et al. |

OTHER PUBLICATIONS

Lavanya et al., (Bioresource Technology, 2016, 203, 228-235).

Pruneda et al., (J. Mex. Chem. Soc. 2005, 49, 14-19).

International Search Report and Written Opinion for International Application No. PCT/US2021/072086, dated Jan. 28, 2022.

International Search Report and Written Opinion for International Application No. PCT/US2021/072052, dated Jan. 27, 2022.

Humooudi et al., Corrosion Mitigation in Crude Oil Process by Implementation of Desalting Unit in Erbil Refinery, American Scientific Research Journal for Engineering, Technology and Sciences, 2017, 36, 224-241.

Show et al., Algal biomass dehydration, Bioresource Technology, 2013, 135, 720-729.

Van Dyk et al., "Potential synergies of drop-in biofuel production with further co-processing at oil refineries", Biofuels, Bioproducts and Biorefining, Society of Chemical Industry and John Wiley & Sons, Ltd., pp. 760-775, 2019.

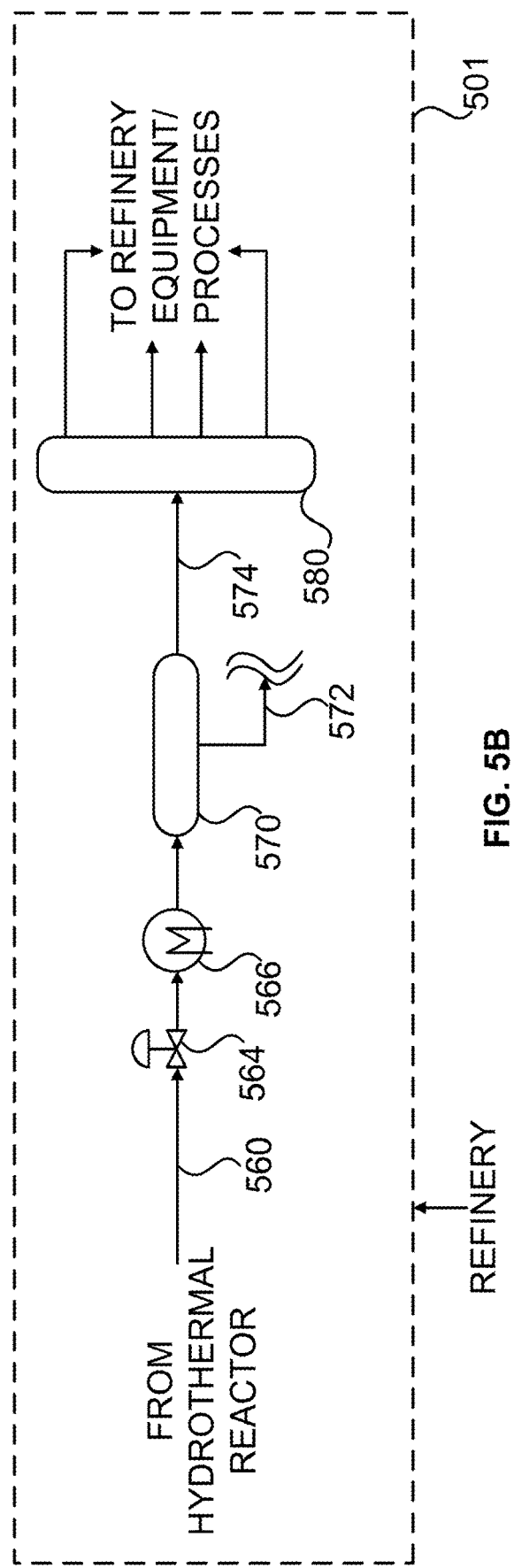

SYSTEMS AND METHODS FOR ENHANCED INORGANIC CONTAMINANT REMOVAL FROM HYDROCARBON FEEDSTOCK

CROSS-REFERENCE TO RELATED APPLICATIONS

This application is a continuation of U.S. Non-Provisional Application Ser. No. 17/687,661, filed Mar. 6, 2022, titled "SYSTEMS AND METHODS FOR ENHANCED INORGANIC CONTAMINANT REMOVAL FROM HYDROCARBON FEEDSTOCK," which is a continuation of U.S. Non-Provisional application Ser. No. 17/452,678, filed Oct. 28, 2021, titled "SYSTEMS AND METHODS FOR ENHANCED INORGANIC CONTAMINANT REMOVAL FROM HYDROCARBON FEEDSTOCK," now U.S. Pat. No. 11,306,260, issued Apr. 19, 2022, which claims priority to and the benefit of U.S. Provisional Application No. 63/198,606, filed Oct. 29, 2020, titled "REFINERY SYSTEMS AND METHODS FOR SEPARATING WATER FROM PRE-TREATED FEEDSTOCK," U.S. Provisional Application No. 63/198,937, filed Nov. 24, 2020, titled "REFINERY SYSTEMS AND METHODS FOR SEPARATING WATER AND REMOVING SOLIDS FROM PRE-TREATED AND UNFILTERED FEEDSTOCK," and U.S. Provisional Application No. 63/198,960, filed Nov. 25, 2020, titled "SYSTEMS AND METHODS FOR ENHANCED INORGANIC CONTAMINANT REMOVAL FROM HYDROCARBON FEEDSTOCK," the disclosures of which are incorporated herein by reference in their entirety.

FIELD OF THE DISCLOSURE

The disclosure herein relates to refinery systems and methods for inorganic contaminant removal from hydrocarbon feedstocks. One or more embodiments of such systems and methods may be suitable for enhanced inorganic contaminant removal from a renewable hydrocarbon feedstock at the refinery.

BACKGROUND

Due to demand for renewable transportation fuel, various feedstock of varying levels of contamination may be considered. Such biomass-derived or renewable feedstock may be relatively inexpensive, but due to the contamination, may require pre-treating prior to processing in a refinery. Such feedstock may include plant oils, algal and microbial oils, waste vegetable oils, yellow and brown grease, tallow, soap stock, pyrolysis oils from plastic or cellulose, and petroleum fractions. The feedstock listed may not be usable due to contamination unless, as noted, pre-treated prior to being utilized in typical refinery operations. Such contamination may cause issues in refinery equipment and operations.

For example, renewable plant oils typically contain phospholipid compounds or complexes. The phosphorous in phospholipids may create issues in refinery equipment, as noted below. For example, phosphorus may poison and deactivate catalysts utilized in hydrotreating, hydrocracking, and hydroisomerization processes. Metals are also present in renewable feedstocks, and can include alkali metals (e.g., sodium, potassium, etc.), metalloids (boron, silicon, arsenic, etc.), and other metals (e.g., calcium, iron, magnesium, nickel, etc.). Such metals are also known to poison and deactivate catalysts utilized in hydrotreating, hydrocracking, hydroisomerization, and other catalytic refining processes. Such issues presented by phosphorus and metal contaminants may lead to more frequent catalyst replacement, which may increase operation costs significantly. Catalysts may be protected using guard beds containing alumina or similar high-surface area materials. The alumina or similar material may absorb low concentrations of metal and phosphorus compounds. Such an approach may increase cost, however, for renewable feedstock, as the renewable feedstock may contain high levels of metals and phosphorus compounds. Further, phosphorus is a nucleating site and catalyst for coke formation. As such, renewable plant oils and other feedstock that are high in phosphorus may cause fouling or coking in fired-furnaces and heat exchangers. These issues, namely fouling and coking, may increase downtime, for example, for decoking and maintenance.

There are several methods to remove metals and phosphorus compounds, including the hydrothermal cleaning process or hydrothermal reaction. Such a process may include combining a renewable feedstock or other feedstock having high levels of metals and/or phosphorus compounds with water. The water and feedstock may be heated and transported to a hydrothermal reactor. Utilizing a combination of temperature (for example, about 465° F. to about 575° F.), pressure, and flow conditions over a period of time, the hydrothermal reactor may wash the metals or phosphorus compounds from the renewable feedstock into the water contained in the water and feedstock mixture. Prior to further refinement of the feedstock in a refinery, the water may be separated from the feedstock.

Salt compounds may typically be limited in crude feedstock for similar reasons as metals and phosphorus, as noted above. For example, salt compounds may cause corrosion, coking, and/or catalyst fouling issues. Conventional desalting processes (for example, via an electrostatic precipitation unit and/or crude desalter unit) may mix petroleum crude oil and water at elevated temperatures through a mixing valve to form a mixed or blended stream. The mixed or blended stream may be fed to a large oil-water separator. The water in the mix or blend may absorb the salt compounds. The separation of water (e.g., the water including the salt compounds) from the feedstock may be facilitated by passing high frequency alternating current or a direct current (for example, via an electrostatic precipitation unit including a grid-like structure of electrodes) through the mixture or blend of the water and feedstock to cause small water droplets to form. Demulsifying agents may also be utilized to facilitate removal of water. Typically, renewable feedstock, such as waste vegetable oil, yellow and brown grease, and tallow, were thought to be difficult to desalt using conventional electrostatic precipitation units and/or crude desalter units, in part, due to the conductivity of these oils and their potential to form soaps and emulsions.

Typically, a large separator (for example, a Stokes Law separator) is used to remove water from pre-treated feedstock following a hydrothermal cleaning unit or hydrothermal reactor. In such examples, the large separator may not be typical for a refinery and may take up large amounts of space, thus increasing overall refinery operation costs and decreasing available real estate for other processes and/or equipment. Further, such a separator may not completely remove the water from pre-treated feedstock from the hydrothermal cleaning unit or hydrothermal reactor (e.g., such a separator may remove all but 2% of water from the pre-treated feedstock). While the amount of metal and/or phosphorus leftover may be small, over time such a small amount may accumulate in downstream refinery equipment, causing fouling and/or coking, among other issues. Further still, the separator may take longer periods (for example, hours rather than minutes) of time to remove the water, since such a separator may rely on time for the feedstock and water to naturally separate or settle.

Accordingly, Applicants have recognized a need for systems and methods to enhance the separation of inorganic contaminants, including metals, from renewable hydrocarbon feedstocks at the refinery. The present disclosure is directed to embodiments of such systems and methods.

SUMMARY OF THE DISCLOSURE

The present disclosure is generally directed to systems and methods to reduce inorganic contaminants in renewable hydrocarbon feedstocks at a refinery. In one embodiment, the process includes passing water through an ion exchange system to generate deionized water having a conductivity of less than about 3 µS/cm and mixing the deionized water with a renewable feedstock that contains hydrocarbon compounds and inorganic contaminants to create a deionized water and renewable feedstock mixture. This mixture is reacted in a hydrothermal reactor at a temperature, pressure and non-laminar flow that does not cause rearrangement reactions of the renewable feedstock hydrocarbon compounds. As such, the non-laminar flow has a Reynolds number greater than 2,000. The reaction in the hydrothermal reactor is maintained at the temperature, pressure and non-laminar flow for a first time interval in order to transfer at least a portion of the inorganic contaminants of the renewable feedstock into the deionized water. After the first time interval, the deionized water and renewable feedstock mixture is passed to a separation unit in which the deionized water containing the inorganic contaminants is separated from the renewable feedstock. During a second time interval, this separation creates a contaminant-rich water and a reduced-contaminant renewable feedstock. After the second time interval, the reduced-contaminant renewable feedstock is passed to a downstream refinery process. In another embodiment, the water passed to the ion exchange system is first passed through a reverse osmosis unit to remove solids. The water treated by reverse osmosis is then passed to the ion exchange system and the process continues as described above.

In another embodiment, the process includes passing water through an ion exchange system to generate deionized water having a conductivity of less than about 5 µS/cm. The deionized water is then aerated in an aerating unit to increase the concentration of dissolved oxygen in the deionized water and thereby generate an aerated, deionized water. The aerated, deionized water is injected into a renewable feedstock stream at a refinery to create a mixture of aerated, deionized water and renewable feedstock. This mixture is reacted in a hydrothermal reactor at a temperature, pressure and non-laminar flow that does not cause rearrangement reactions of the renewable feedstock hydrocarbon compounds. As such, the non-laminar flow has a Reynolds number greater than 2,000. The reaction in the hydrothermal reactor is maintained at the temperature, pressure and non-laminar flow for a first interval of time in order to transfer at least a portion of the inorganic contaminants of the renewable feedstock into the aerated, deionized water. After the first time interval, the mixture is passed to a separation unit of the refinery. During a second time interval, the aerated, deionized water containing the inorganic contaminants is separated from the renewable feedstock to create contaminant-rich water and a reduced-contaminant renewable feedstock. After the second time interval, the reduced-contaminant renewable feedstock is passed to a downstream processing unit of the refinery. In an alternative embodiment, the water is aerated in the aeration unit prior to being treated in the ion exchange system. In another embodiment, the water passed to the ion exchange system is first passed through a reverse osmosis system to remove solids. The water treated by reverse osmosis is then passed to the ion exchange system and the process continues as described above. In this latter embodiment, the water may be aerated prior to treatment by reverse osmosis, after treatment by reverse osmosis, or after treatment by the ion exchange system.

A refinery system for reducing contaminants in renewable hydrocarbon feedstocks is disclosed. In one embodiment, the refinery system includes a source of a renewable feedstock having hydrocarbons compounds and inorganic contaminants and a source of water. The refinery system also includes a deionized water generator in fluid communication with the source of water, whether such water is non-deaerated or aerated. The deionized water generator is arranged and designed to generate a stream of deionized water having a conductivity of less than about 1 µS/cm. A mixer in fluid communication with the source of renewable feedstock and in fluid communication with the deionized water stream is provided, and the mixer is configured to receive the deionized water stream and renewable feedstock stream to thereby create a mixture of deionized water and renewable feedstock. The refinery system also includes a hydrothermal cleaning unit, positioned at the refinery, in fluid communication with the mixer to receive the mixture. The hydrothermal cleaning unit is configured to transfer inorganic contaminants contained in the renewable feedstock into the deionized water during a first time interval. An oil-water separator, at the refinery, is in fluid communication with the hydrothermal cleaning unit. The oil-water separator is configured to receive the mixture from the hydrothermal cleaning unit and provide a residence time to separate the renewable feedstock from the deionized water containing the inorganic contaminants, thereby generating a reduced-contaminant renewable feedstock. In one or more embodiments, the refinery system also includes a downstream refinery process unit in fluid communication with the oil-water separator and configured to receive the reduced-contaminant renewable feedstock.

A controller to operate a hydrothermal cleaning unit to reduce metal contaminants in a renewable hydrocarbon feedstock and operate an oil-water separator to separate deionized water from reduced-contaminant renewable hydrocarbon feedstock at a refinery is also disclosed. In one embodiment, the controller includes a first input/output in signal communication with a flow control valve of a refinery. The flow control valve is configured to combine an amount of a water stream containing deionized water and an amount of a feedstock stream containing a contaminant-rich renewable feedstock to create a mixture of the deionized water and contaminant-rich renewable feedstock. Here, the controller is configured to determine the amount of the water stream to combine with the feedstock stream, based on a type of contaminant-rich renewable feedstock contained in the feedstock stream. In one or more embodiments, the controller also includes a second input/output in signal communication with a heat exchanger of the refinery. The heat exchanger is operable to heat the mixture of the deionized water and contaminant-rich renewable feedstock to a specified temperature. Here, the controller is configured to determine the specified temperature based on a first length of time for a hydrothermal reaction. In one or more embodiments, the controller also includes a third input/output in signal communication with a hydrothermal reactor of the refinery. The hydrothermal reactor is operable to transfer contaminants in the contaminant-rich renewable feedstock into the deionized water over the first length of time to thereby generate contaminant-rich water and a pre-treated renewable feedstock. Here, the controller is configured to determine the first length of time based on an amount of contaminants in the contaminant-rich renewable feedstock. In one or more embodiments, the controller also includes a fourth input/output in signal communication with an oil-water separator of the refinery. The oil-water separator is operable to separate the contaminant-rich water from the pre-treated renewable feedstock over a second length of time. Here, the controller is configured to determine the second length of time based on the amount of contaminants in the contaminant-rich water. In one or more embodiments, the controller includes a fifth input/output in signal communication with a pump configured to raise the pressure of at least one of the water stream or feedstock stream to an operating pressure. Here, the controller is configured to determine the operating pressure based on an amount of contaminants in the contaminant-rich renewable feedstock.

A process for reducing metals contaminants in renewable hydrocarbon feedstocks at a refinery is also disclosed. In one embodiment, water is passed through a deionized water generator to generate deionized water having a conductivity of less than about 1 μS/cm. Either the deionized water or the pre-deionized water may be passed through an aeration unit to increase the concentration of dissolve oxygen. The aerated, deionized water is mixed with a renewable feedstock having hydrocarbon compounds and metals contaminants to create a deionized water and renewable feedstock mixture. This mixture is passed into a hydrothermal reactor at a pre-selected temperature, pressure and flow condition. In one or more embodiments, the flow condition is non-laminar flow having a Reynolds number greater than 2,000. The temperature, pressure and flow condition of the hydrothermal reactor are maintained for a first interval of time to transfer at least a portion of the metal contaminants associated with the renewable feedstock into the aerated, deionized water. After the first time interval, the aerated deionized water and renewable feedstock mixture are passed to a separation unit. The aerated, deionized water containing the metal contaminants is separated from the renewable feedstock in the separation unit to create contaminant-rich water and a reduced-contaminant renewable feedstock for a second time interval. After the second time interval, the reduced-contaminant renewable feedstock is passed to a downstream refinery unit for further processing.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other implementations, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

Figure 5A:
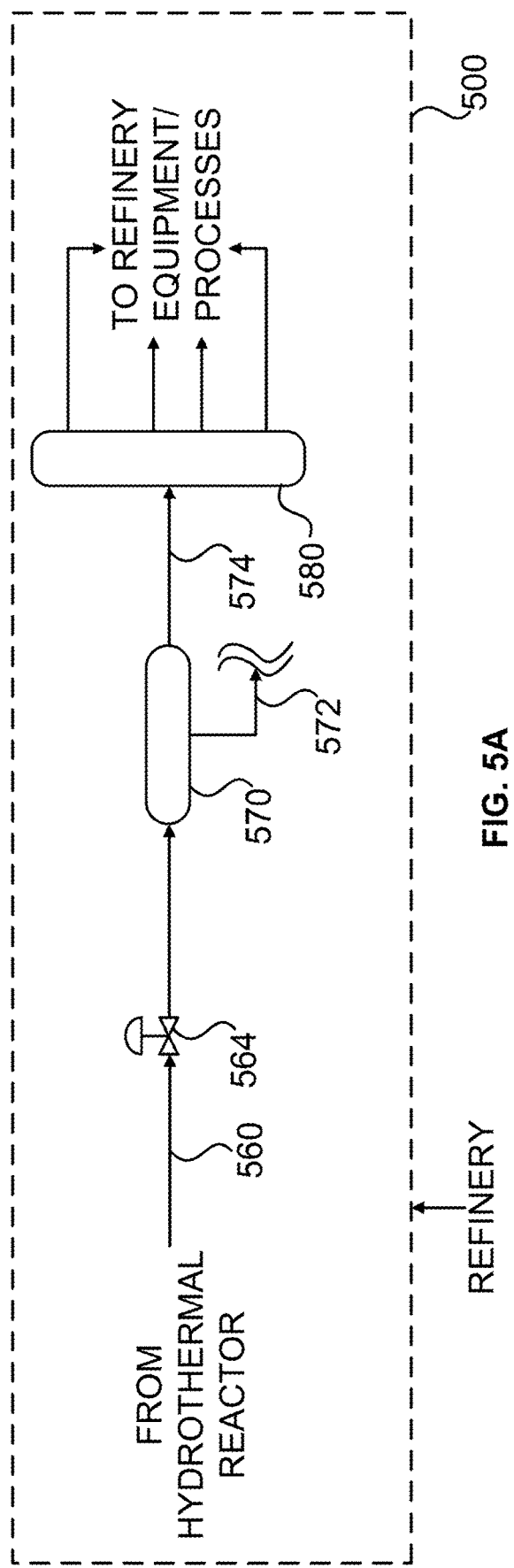
Figure 5C:
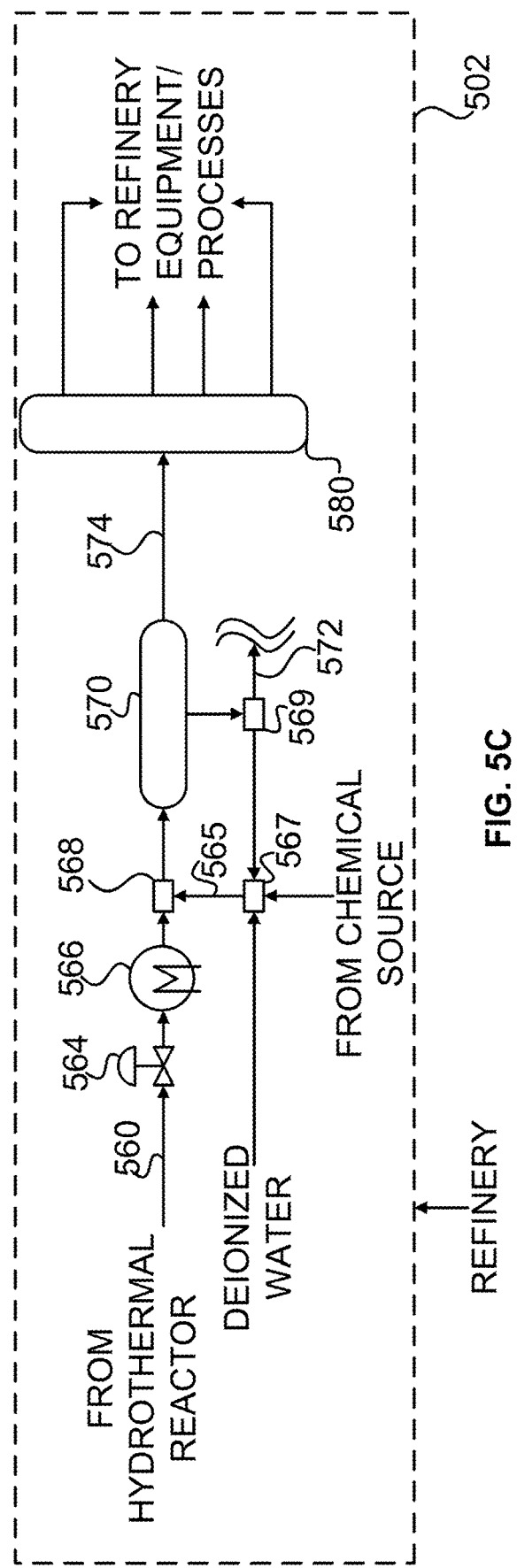
Figure 6:
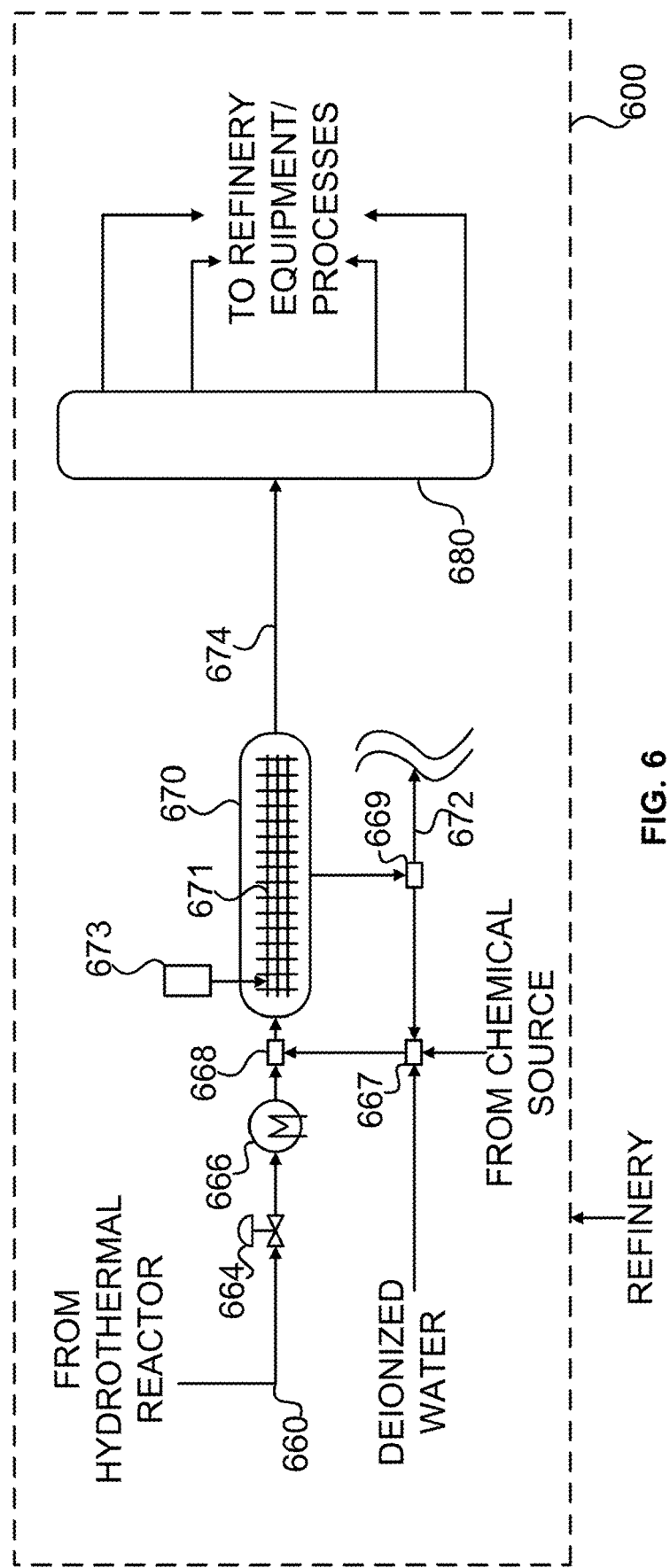
Figure 7A:
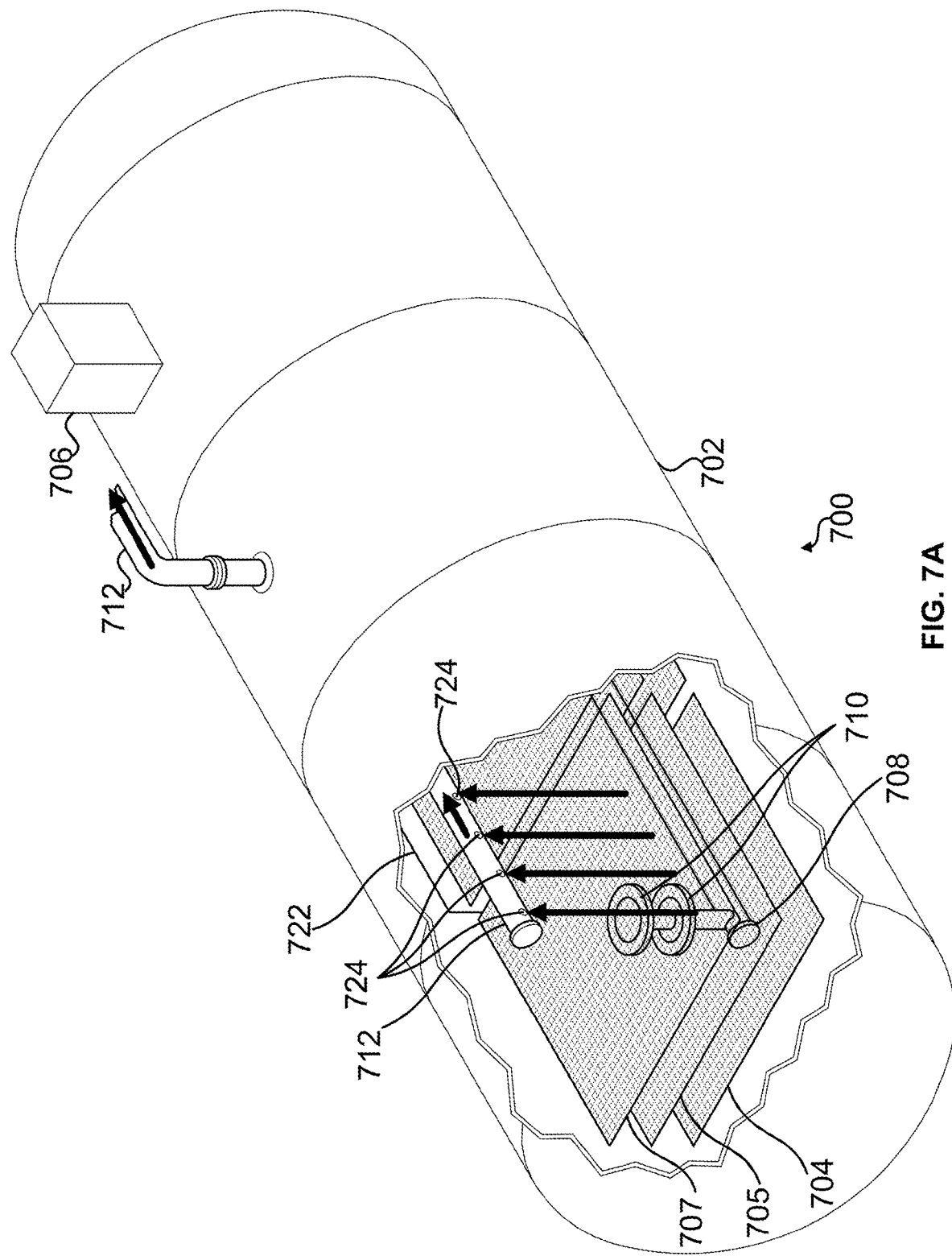
Figure 7B:
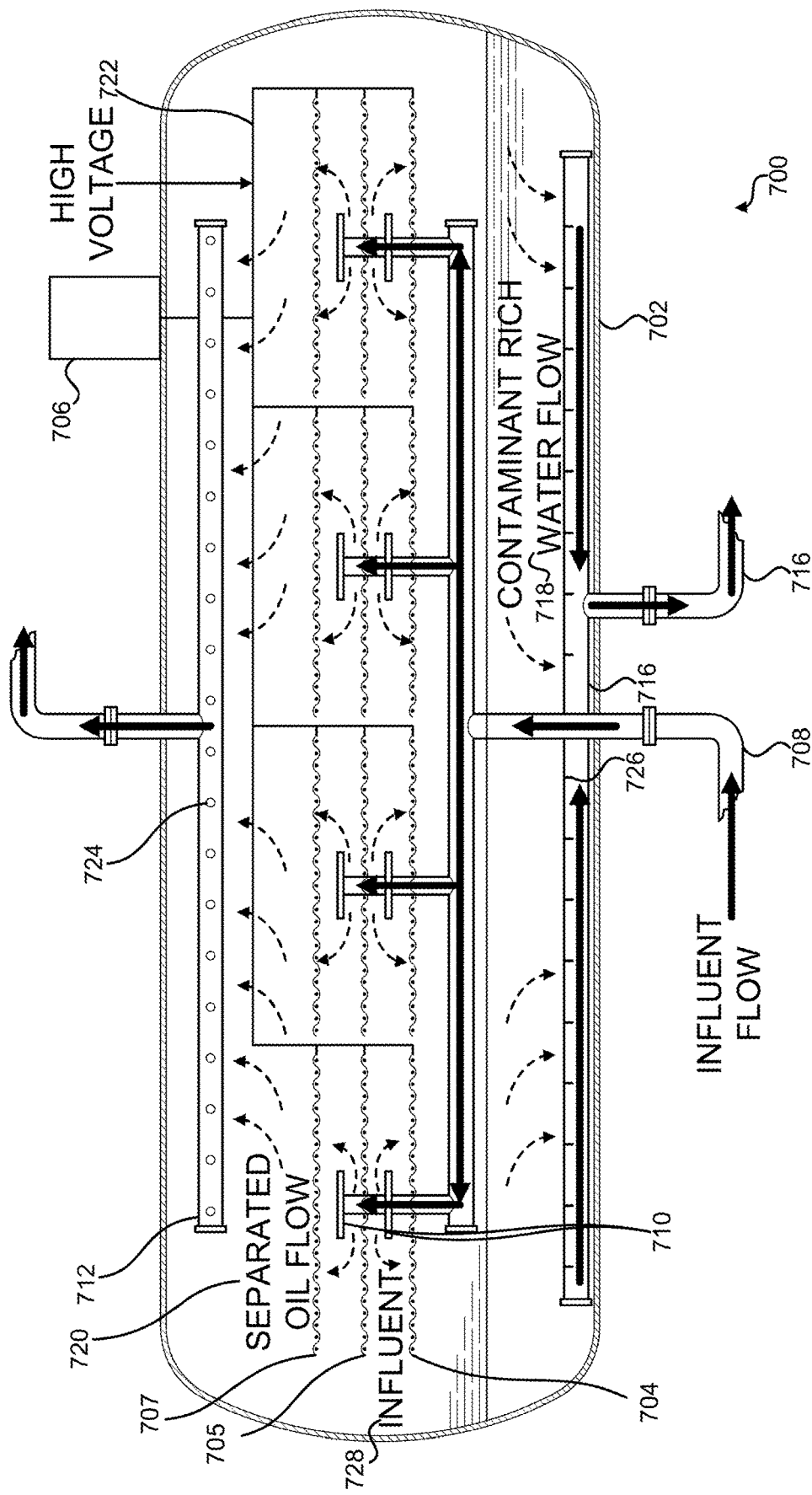
Figure 12:
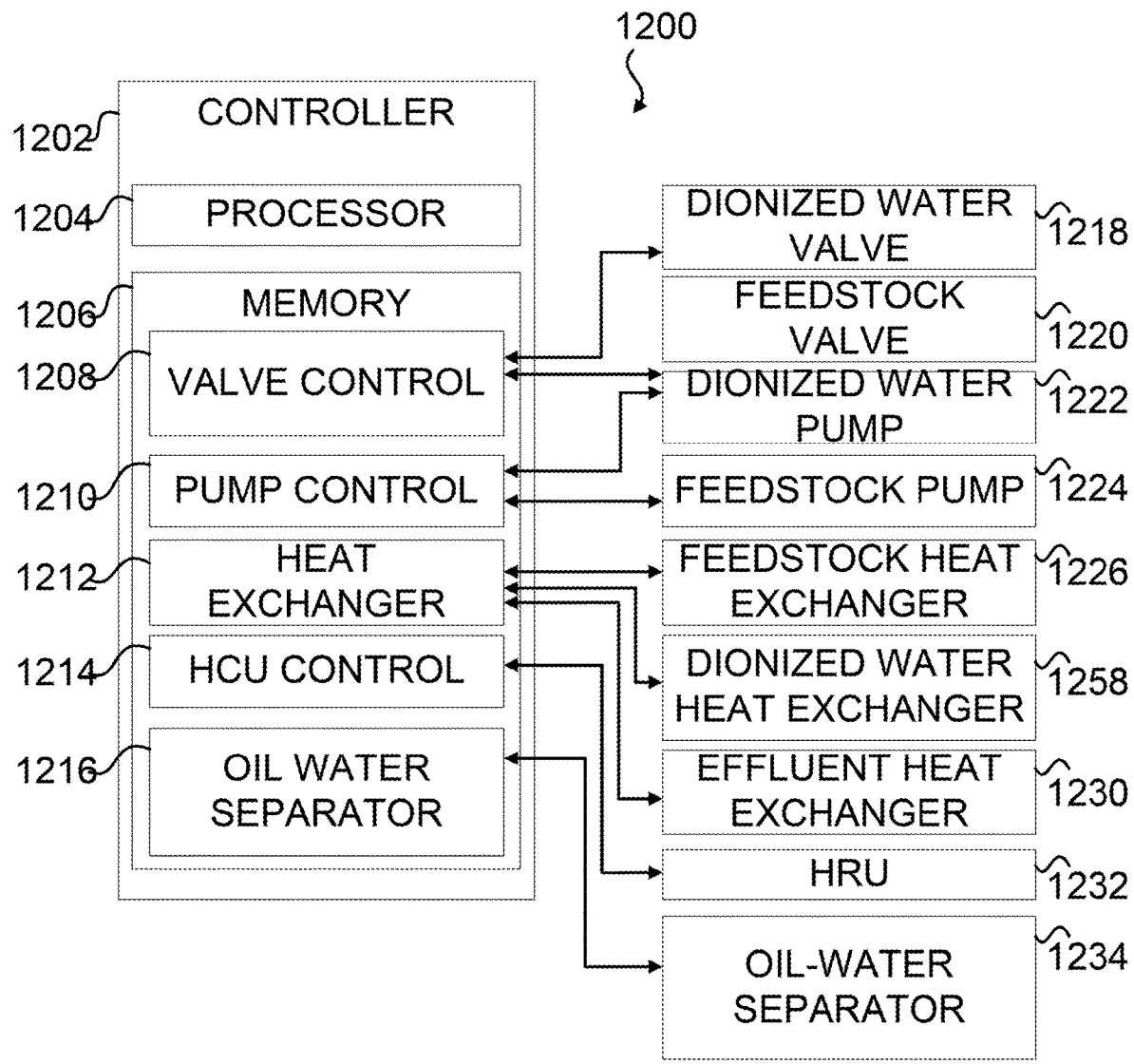
Figure 13:
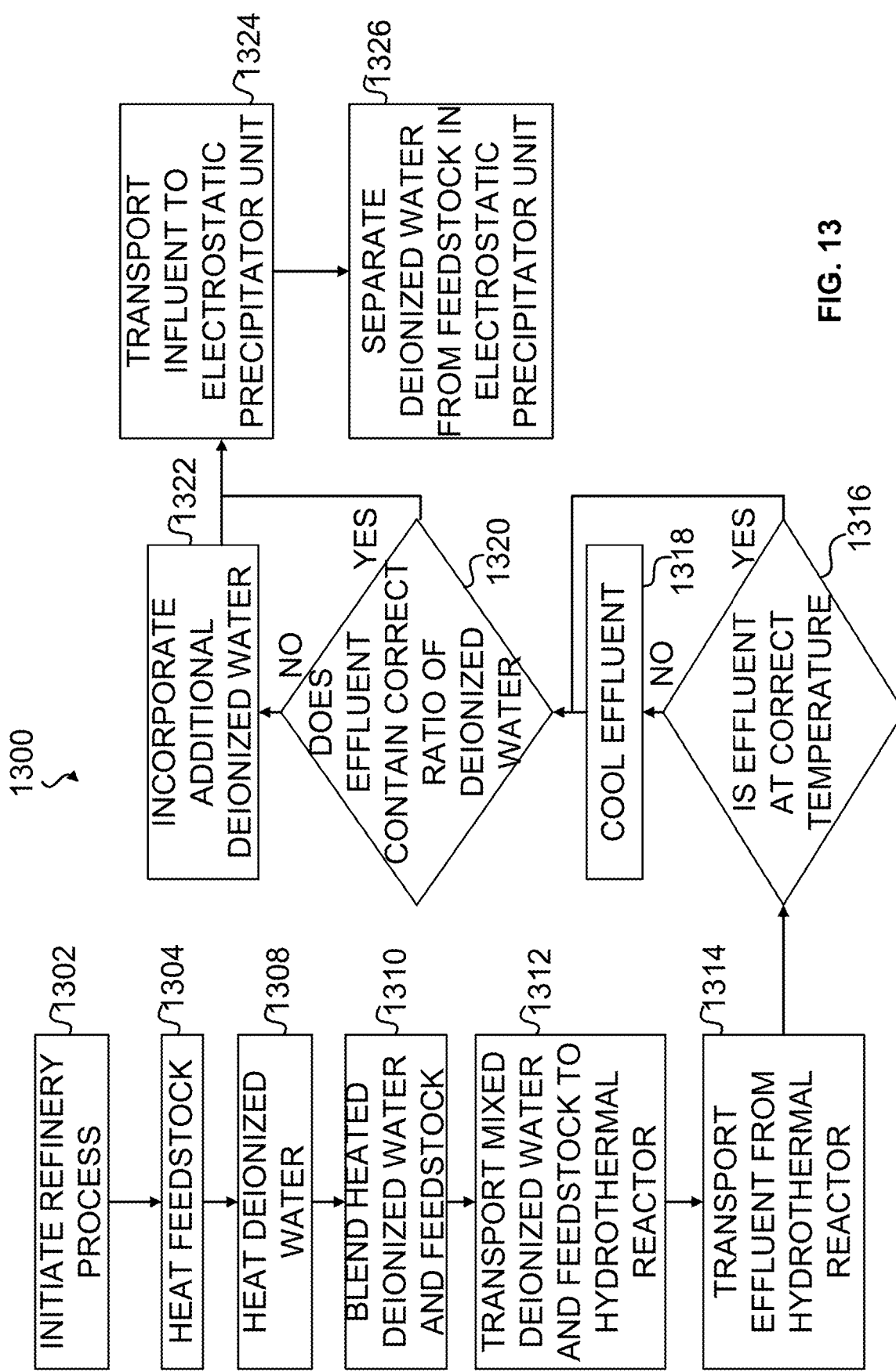
Figure 14:
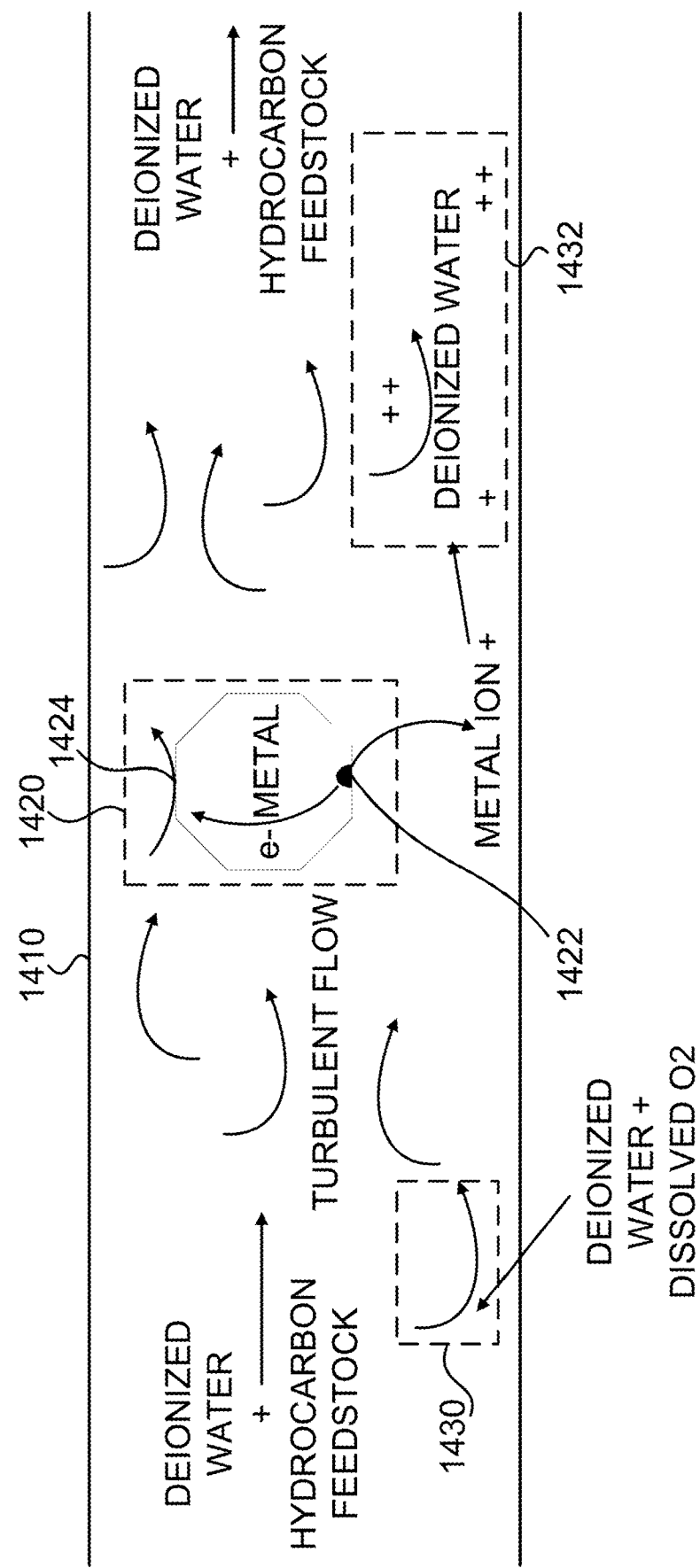

Having thus described the disclosure in general terms, reference will now be made to the accompanying drawings, which are not necessarily drawn to scale, and wherein:

FIGS. 1-4 are schematic diagrams illustrating refinery systems for removing inorganic contaminants, including metals, from a renewable hydrocarbon feedstock, according to embodiments of the disclosure;

FIGS. 5A-5C are schematic diagrams illustrating refinery systems for separating the hydrocarbon feedstock and deionized water mixture that flows from the hydrothermal reactor, according to embodiments of the disclosure;

FIGS. 6, 7A, and 7B illustrate features an oil-water separation unit and flow arrangement, according to embodiments of the disclosure;

FIGS. 8-11 are schematic diagrams illustrating additional refinery systems for removing inorganic contaminants, including metals, from a renewable hydrocarbon feedstock, according to embodiments of the disclosure;

FIG. 12 is a simplified block diagram illustrating a control system for managing the removal of inorganic contaminants, including metals, from a renewable hydrocarbon feedstock, according to an embodiment of the disclosure;

FIG. 13 is a flow diagram, implemented in a controller, for managing the removal of inorganic contaminants, including metals, from a renewable hydrocarbon feedstock, according to an embodiment of the disclosure; and FIG. 14 is a diagram illustrating how metal contaminants in the hydrocarbon feedstock may be liberated and transferred into the deionized water solvent in the hydrothermal reactor, according to one or more embodiments of the disclosure.

DETAILED DESCRIPTION OF THE DISCLOSURE

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure is directed to refinery systems and methods for the separation of inorganic contaminants, such as metals and phosphorus, from a hydrocarbon feedstock, including petroleum hydrocarbons and biomass feedstocks. While typical petroleum-based feedstock may not include significant amounts of metal or phosphorus (e.g., the amount of phosphorus in a petroleum-based feedstock may be undetectable or at about 1 to 2 parts per million (ppm)), renewable feedstock, however, may include significant amounts metal, phosphorus, and/or other contaminants (e.g., an amount significant enough to cause fouling, coking, catalyst deactivation, or other issues within refinery equipment, such amount being in the hundreds to thousands parts per million). Removal of such metals, phosphorus, and/or other contaminants may be performed via a hydrothermal cleanup process (e.g., by washing the hydrocarbon feedstock with water at elevated temperature and pressure via a hydrothermal cleaning unit or hydrothermal reactor). In one or more embodiments disclosed herein, an amount of a deionized water may be mixed with the renewable hydrocarbon feedstock and fed to a hydrothermal reactor at a particular temperature, pressure, turbulent flow and/or time. During the residence time in the hydrothermal reactor, and while the temperature, pressure, and turbulent flow are maintained, the inorganic contaminants contained in the renewable hydrocarbon feedstock are liberated and transferred into the deionized water. The deionized water along with the inorganic contaminants may then be removed from the treated renewable hydrocarbon feedstock through an oil-water separator (e.g., such as a Stokes' Law oil-water separator). The separated, contaminant-lean renewable feedstock may be then passed to downstream refinery processes for further refinement. The deionized water flowing out of the oil-water separator may be saturated with or contain the metal, phosphorus compounds, salt compounds, and/or other contaminants removed from the renewable feedstock. This deionized water effluent may be treated in an industrial wastewater treatment system, e.g., to remove the inorganic contaminants therefrom, as is known to those skilled in the art.

Figure 1:
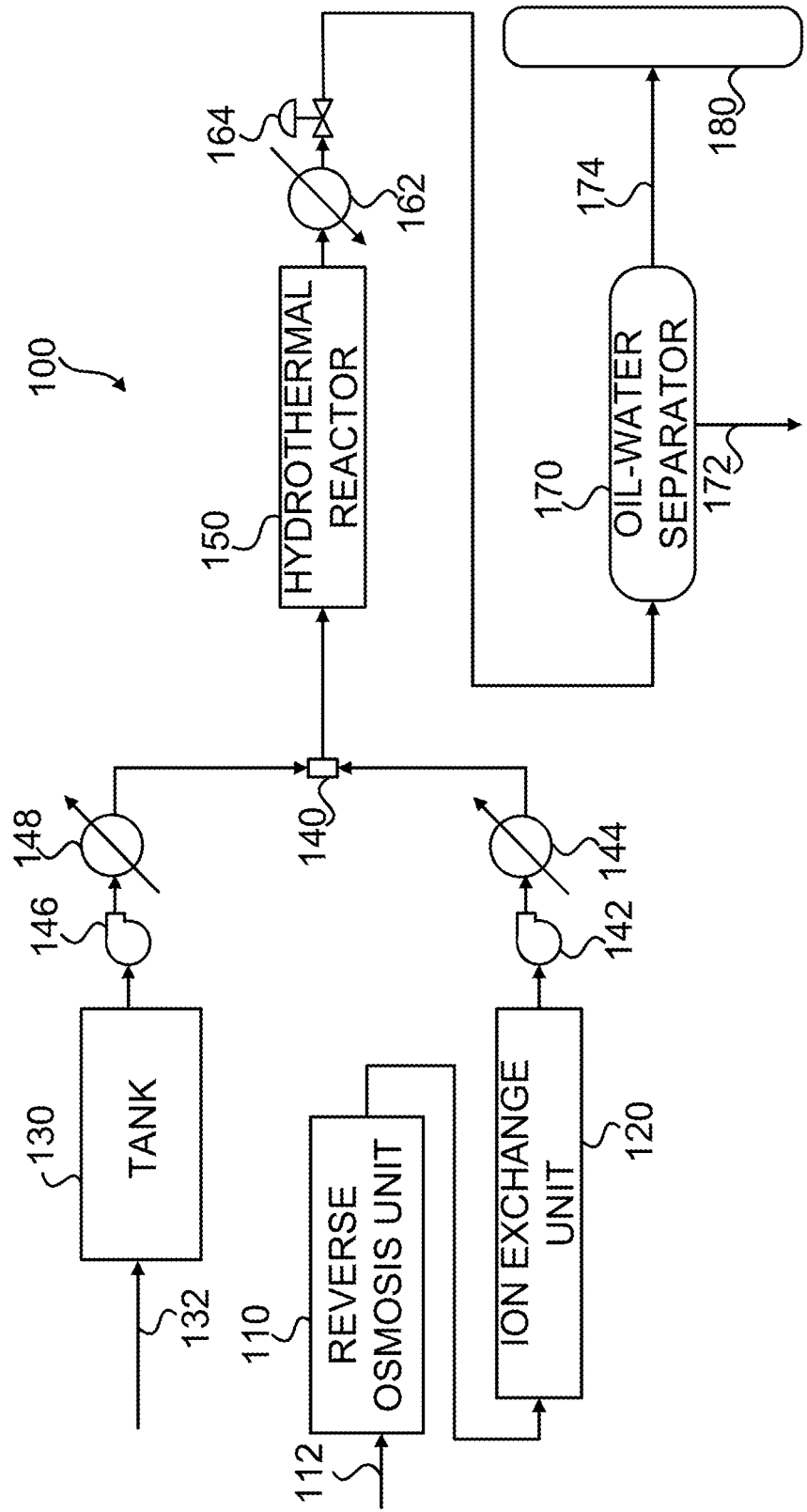

FIGS. 1-4 are schematic diagrams illustrating refinery systems for inorganic contaminant removal from hydrocarbon feedstocks, according to one or more embodiments. In such embodiments, the systems illustrated in FIGS. 1 through 4 may be a part of, included in, disposed at, or integrated into a refinery. In FIG. 1, a system 100 is illustrated including various components. Pipeline, piping, pipes, and/or other conduit may be disposed throughout the system 100 to convey, transfer, or transport fluids, liquids, gases, and/or solids from one point or location within or external to the system 100 to another point or location external to or within the system 100. In an example, the pipeline or piping utilized may be anti-corrosive. Due to the corrosive nature of the contaminants in the feedstock (such as free fatty acids) and of the deionized water mixed with the feedstock, the pipeline or piping may utilize or be constructed of an anti-corrosive material, such as stainless steel, e.g., 316 stainless steel or 317L stainless steel, or include anti-corrosive coatings. Further, all or some of the components, e.g., the fluid facing components, described herein (e.g., pumps, flow control valves, heat exchangers, etc.) may be constructed of such anti-corrosive materials or include anti-corrosive coatings, due to the potentially corrosive nature of the feedstock and of the deionized water solvent. Throughout this disclosure, the terms pipeline, piping, pipe, and/or pipes may be used interchangeably.

As illustrated in FIG. 1, a source of water 112 is optionally passed into a reverse osmosis unit 110 to purify the water. The water from source 112 may be a non-deaerated water, such that the water has not been deaerated, and thus may contain some gases (e.g., dissolved oxygen, dissolved carbon dioxide, etc.) diffused therein at the source. As is well known in the art, reverse osmosis units purify water by forcing the water under pressure through a semi-permeable membrane that permits water, as well as dissolved oxygen, some ions, and other contaminants smaller than the membrane pores, to move through the membrane while retaining solids, including dissolved solids, on the high pressure side (or brine side) of the membrane. The water crossing the membrane (i.e., permeate) is between about 90% to about 99% free of contaminants. The extent to which ions and other contaminants are removed (i.e., retained on the brine side of the membrane) depends on several factors, including but not limited to, the operating pressure of the reverse osmosis unit, the feed concentration, the valence of the ions, etc. Thus, the permeate from a reverse osmosis unit may continue to have an ion concentration, such that the conductivity of the reverse osmosis water (i.e., the partially deionized water generated by the reverse osmosis unit 110) may be between about 5 µS/cm and about 15 µS/cm. In other embodiments, the conductivity may be as high as about 20 µS/cm, about 30 µS/cm or even greater. In one or more embodiments (not shown), operation of the reverse osmosis may be further enhanced by first passing the water from its source through a filter, such as a carbon filter, fiber mesh filter, etc., in order to at least partially clean the water prior to being passed to the reverse osmosis unit. In one or more other embodiments (not shown), the partially deionized water from the reverse osmosis unit may be further purified by passing the permeate or deionized water through a filter, such as a carbon filter, fiber mesh filter, etc.

As illustrated in FIG. 1, the partially deionized water from the reverse osmosis unit 110 is then passed to an ion exchange system 120 to further purify the water (e.g., through softening, demineralization, etc.). As is well known to those skilled in the art, an ion exchange system, in a demineralization application, can function to exchange cations in the water with hydrogen ions in one bed and exchange anions in the water with hydroxyl ions in another bed. After all of the cations and anions in the water (i.e., minerals and contaminant ions/molecules) have been exchanged, the resulting deionized water from the ion exchange system 120 has remaining ions on the order of less than parts per millions or even billions. The conductivity of such deionized water (generated from the ion exchange system 120) can be much less than the conductivity resulting from a reverse osmosis unit. In one or more embodiments, the deionized water from an ion exchange system 120 may be less than about 10 µS/cm, less than about 5 µS/cm, less than about 3 µS/cm, less than about 1 µS/cm, less than about 0.5 µS/cm or even less.

While FIG. 1 shows the use of a reverse osmosis unit 110 positioned upstream of the ion exchange system 120, the treatment of water by reverse osmosis is optional, as previously noted. Thus, in embodiments in which a reverse osmosis unit is not employed, the water from the source 112 is passed directly to the ion exchange system 120. In one or more other embodiments (not shown), the water from source 112 is passed through a carbon black filter, fiber mesh filter, or other type of mechanical filter known to those skilled in the art prior to being passed to the ion exchange system 120. In one or more other embodiments (not shown), a reverse osmosis unit may be used in place of an ion exchange system, for example, to produce a partially deionized water for mixing with the hydrocarbon feedstock.

Deionized water is known as a universal solvent. It is highly corrosive to carbon steel, copper, and other types of metals, as is known to those skilled in the art. Because deionized water lacks buffering ions, such as the metal ions (e.g., calcium ions, iron ions, sodium ions, etc.) removed during ion exchange, the deionized water has an affinity for metal ions as buffering ions and readily attracts metal ions therein. Thus, when deionized water encounters metals that are susceptible to corrosion, the deionized water is believed to act a driving force to further the corrosion or oxidation of the metals thereby liberating metals to be transferred into the deionized water as ions. The deionized water may further cause the dissociation of existing ionic bonds of metal compounds, such that the metal ions are transferred into the deionized water. In one or more embodiments, the materials of construction of the various piping and/or refinery equipment are selected to reduce the corrosion due to the deionized water generated by the ion exchange system 120. According to ASTM D1193-91, there are various levels of purity or types of deionized water. In one or more embodiments of this disclosure, the deionized water used is of Type IV, and has a resistivity (Ω-cm) of between about 4 and about 0.2, a conductivity (μS/cm) of between about 0.25 and about 5, a pH at 25° C. of between about 5.0 and about 8.0, a sodium concentration of <50 ppb, and a chloride concentration of <50 ppb. In one or more other embodiments, deionized water or pure water of Types I, II, or III, according to ASTM D1193-91, may be used. For instance, Type III may be used and has a resistivity (Ω-cm) of greater than about 4, a conductivity (μS/cm) of less than about 0.25, a total organic carbon of less than about 200, a sodium concentration of <10 ppb, a chloride concentration of <10 ppb, and a silica concentration of <500 μg/L. Thus, in one or more embodiments of the system and method disclosed herein, the deionized water used, whether generated by a reverse osmosis unit, an ion exchange system, or both in tandem, has a conductivity at generation of less than about 5 μS/cm, less than about 3 μS/cm, less than about 2 μS/cm, less than about 1 μS/cm, less than about 0.8 μS/cm, less than about 0.6 μS/cm, less than about 0.5 μS/cm, less than about 0.4 μS/cm, less than about 0.25 μS/cm, or even less.

The deionized water generated at ion exchange system 120 is passed to and becomes feed for pump 142. While not shown in FIG. 1, a tank or other vessel may be positioned in fluid communication between the ion exchange system 120 and pump 142, such that an adequate amount of deionized fluid is readily available for pump 142. Pump 142 pumps the deionized water through a heat exchanger 144 and to a mixer 140. In addition to driving the deionized water through the associated piping, pump 142 may pressurize the deionized water to the operating pressure of the hydrothermal reactor 150, which will be further described below. The heat exchanger 144 may heat the deionized water to the operating temperature of the hydrothermal reactor 150. Heat exchanger 144 permits heat to be transferred and added to the deionized water stream from a dedicated hot fluid stream (e.g., steam) and/or through heat integration from a hot process fluid stream, as is well known to those skilled in the art. The heated and pressurized deionized water is fed or passed to a mixer 140, which may be a mixing valve, in-line mixer, or other device that allows two fluid streams to be combined and/or mixed to create a single fluid outlet stream.

In one or more embodiments, a weak acid, such as citric acid, acetic acid, etc., may be added to or injected into the deionized water prior to mixing with the hydrocarbon feedstock in mixer 140. One benefit of a lower conductivity deionized water is that the addition of acid to the deionized water may be reduced as compared to a higher conductivity deionized water. With respect to a lower conductivity deionized water, the acid has a more pronounced effect because of the lack of ions/buffering ions in the lower conductivity water. Thus, with lower conductivity, e.g., less than 1 μS/cm, less than 0.5 μS/cm, or even lower, less acid will be needed to facilitate liberation of metals and other inorganic compounds in the hydrocarbon feedstock (e.g., through corrosion, etc.), as described further below.

As further illustrated in FIG. 1, a hydrocarbon feedstock is procured via stream 132 and is passed to tank or other vessel 130 for holding and/or storage. The hydrocarbon feedstock is as described above and may be a petroleum hydrocarbon or a biomass/renewable hydrocarbon. The hydrocarbon feedstock entering tank 130 via stream 132 has inorganic contaminants, including metals and/or phosphorus, to be removed prior to further refinery processing. Pump 146 pumps the fluid hydrocarbon feedstock from tank 130 to and through a heat exchanger 148 and to the mixer 140. In addition to driving the fluid hydrocarbon feedstock through the associated piping, pump 146 may pressurize the hydrocarbon feedstock to the operating pressure of the hydrothermal reactor 150, which will be further described below. The heat exchanger 148 may heat the hydrocarbon feedstock to the operating temperature of the hydrothermal reactor 150. Heat exchanger 148 permits heat to be transferred and added to the hydrocarbon feedstock stream from a dedicated hot fluid stream (e.g., steam) and/or through heat integration from a hot process fluid stream, as is well known to those skilled in the art. The heated and pressurized hydrocarbon feedstock is fed or passed to the mixer 140. In mixer 140, the hydrocarbon feedstock and the deionized water are mixed to create a deionized water and hydrocarbon feedstock mixture. In one or more embodiments, the deionized water is mixed with the hydrocarbon feedstock such that the deionized water is at least 10%, at least 15%, at least 20%, at least 25%, at least 30%, at least 35%, at least 40%, at least 45%, at least 50%, at least 55%, at least 60%, at least 65% or even more by volume of the total mixture of deionized water and hydrocarbon feedstock. In one or more embodiments, the deionized water is at least one-third by volume of the total mixture of deionized water and hydrocarbon feedstock. In one or more other embodiments, the deionized water is at least half by volume of total mixture of deionized water and hydrocarbon feedstock.

The hydrothermal reactor 150 is arranged to receive the mixture of deionized water and hydrocarbon feedstock. The reactor 150 may be a continuous stirred tank reactor, plug flow reactor, or other type of reactor known to those skilled in the art to permit the mixture to flow therein for a residence time at a specified temperature and pressure. In one or more embodiments, the reactor 150 may be a combination of continuous stirred tank reactors, plug flow reactors or a combination of both. The liberation of metals and/or other inorganic contaminants from the hydrocarbon feedstock (e.g., oils) may be accomplished at elevated temperature and pressure. In one or more embodiments, the temperature of the reactor 150 may be maintained between about 200° C. and about 500° C. In one or more embodiments, the temperature of the reactor 150 may be maintained between about 200° C. and about 450° C., between about 200° C. and about 400° C., between about 200° C. and about 350° C., or even between about 200° C. and about 300° C. The heat exchangers 144, 148 may be arranged to deliver the deionized water and hydrocarbon at the specified operating temperature of the reactor 150. In one or more embodiments, the pressure of the reactor 150 may be maintained between about 500 psig to about 6,000 psig. In one or more other embodiments, the pressure of the reactor 150 may be maintained between about 1,000 psig and about 1,500 psig. In one or more other embodiments, the pressure of the reactor 150 may be maintained between about 2,000 psig and about 3,500 psig. In one or more embodiments, the pressure may be specified to maintain the mixture (or portions thereof) in a liquid phase, in a vapor-liquid phase or in a partial or full supercritical phase. In one or more embodiments, the flow of the mixture in the reactor is non-laminar flow. Laminar flow is typically flow that has a Reynolds number less than 2,000. In those embodiments in which non-laminar flow is maintained through the reactor, the Reynolds number is greater than 2,000, such that the flow may be considered turbulent or in transition to turbulent flow.

The temperature, pressure, and flow (laminar versus non-laminar) are specified to reduce rearrangement reactions involving the hydrocarbon chains of the hydrocarbon feedstock. In other words, the temperature, pressure and non-laminar flow are selected to wash and liberate inorganic contaminants from the hydrocarbon feedstock but not cause cracking, isomerization or similar reactions involving the hydrocarbon chains of the hydrocarbon feedstock. In one or more embodiments, the residence time or time interval in which the mixture resides within the reactor may be between about 30 seconds to about 5 minutes or even between about 1 minute and about 4 minutes. In one or more other embodiments, residence time may be longer, especially at reduced temperature and pressure, such that the time may be as much as 6 minutes, 7 minutes, 8 minutes, 9 minutes, or even 10 minutes.

Turning now to FIG. 14, a plug flow reactor 1410 is illustrated. A mixture of deionized water and hydrocarbon feedstock flow through the reactor 1410 from left to right. As represented by the curved arrows, the flow of the mixture may be considered to be non-laminar or turbulent, having a Reynolds number greater than 2,000. Dotted line box 1430 represents deionized water within the mixture that has dissolved oxygen associated therewith. Dotted line box 1420 represents hydrocarbon feedstock with an associated metal contaminant illustrated by the octagon. The dissolved oxygen in the deionized water 1430 is believed to react with the metal particle at 1424 to generate water $H_2O$ from the oxygen $O_2$. To form the water $H_2O$, hydrogen ions $H^+$ from the aqueous fluid (e.g., carbonic acid in the deionized water) are contributed to the oxygen $O_2$ as well as electrons $e^-$, which are contributed by the metal itself from a point 1422. As shown in FIG. 14, point 1424 serves as the cathode while point 1422 serves as the anode. At the anode 1422, the metal is removed into the aqueous fluid (i.e., deionized water) as positive metal ions as elections $e^-$ are removed from the metal and transferred to the cathode as shown. The remaining metal becomes pitted as metal is removed as aqueous metal ions. As previously described, the positive metal ions liberated from the metal particle associated the hydrocarbon feedstock are believed to have an affinity for and are attracted to the deionized water 1432, which seeks the metal ions (shown collected within the deionized water at 1432) as buffering ions.

While the representation illustrated in FIG. 14 provides some insight into how the deionized water, and dissolved oxygen therein, may act to enhance metal liberation and transfer from the hydrocarbon feedstock into the deionized water, other actions and methods of electrochemical reaction and/or metal liberation/transfer as they may occur are not to be precluded by this sole representation and are understood to be included herein. For example, and not to be limiting, the dissolved oxygen may further combine with positive metal ions to create metal oxides. Further still, the deionized water may hasten the dissociation of ionic bonds involving metal compounds, thereby releasing metal ions that are then attracted by and concentrated in the deionized water. In any case, the use of deionized water in place of non-deionized water in the hydrothermal reactor increases the liberation and transfer of metals from the hydrocarbon feedstock to the deionized water for removal. And, as the conductivity of the deionized water becomes lower, e.g., less than 3 μS/cm, less than 1 μS/cm, less than 0.8 μS/cm, or even lower, the liberation and transfer of metals from the hydrocarbon feedstock to the deionized water may increase, and thereby be enhanced.

After the mixture has flowed through or within the reactor 150 for the residence time, the mixture exits the reactor 150 and is passed via piping to a heat exchanger 162 to recover heat from the mixture, thereby cooling the mixture. This piping transports the effluent or pre-treated feedstock (e.g., pre-treated by the hydrothermal reactor 150) from the hydrothermal cleaning unit or hydrothermal reactor 150 through the heat exchanger 162 and through a flow control valve 164 to an oil-water separator 170 (e.g., a Stokes' Law separator). As noted, effluent may refer to the liquid or pre-treated feedstock output from the hydrothermal cleaning unit or hydrothermal reactor 150. The liquid may include a blend of water and feedstock, with the water including the inorganic contaminants (e.g., metals, phosphorus, etc.) washed from the feedstock in the hydrothermal cleaning unit or hydrothermal reactor 150. The flow control valve 164 may lower or drop the pressure of the effluent, at which point the effluent may be considered influent (e.g., influent into the oil-water separator 170). The influent may refer to the pre-treated feedstock entering the oil-gas separator, for which the pre-treated feedstock may exhibit a change or alteration (e.g., pressure drop, temperature change, added water, and/or added chemicals). The influent, with a lower pressure than the effluent, may then be transported or transferred to an oil-water separator 170 (e.g., a Stokes' Law separator, crude desalter unit including an electrostatic precipitator, etc.). In such examples, the pressure of the effluent in piping (upstream of the flow control valve 164) may be higher than the operating pressure of the oil-water separator 170. As such, the flow control valve 164 may lower the pressure to within the range of operating pressures of the oil-water separator 170. The oil-water separator 170 may separate the deionized water from the hydrocarbon feedstock. The deionized water may be collected at a point at or along the bottom of the oil-water separator 170 and be drained therefrom for another use or for wastewater treatment at point 172. The oil-water separation unit 170 and associated equipment may be included at or integrated into a refinery. The remaining treated hydrocarbon feedstock may be transported from the oil-water separator 170 via piping 174 to a downstream refinery process unit 180, to a tank, to a feed drum for further transfer of feedstock to a reactor, or other component/equipment within the refinery. The oil-water separator 170 may be a large separator (for example, a Stokes Law separator), which is used to remove water from the pre-treated hydrocarbon feedstock downstream of the hydrothermal cleaning unit or hydrothermal reactor 150. In such examples, the large separator may not be typical for a refinery and may take up large amounts of space, thus increasing overall refinery operation costs and/or decreasing available real estate for other processes and/or equipment. Further, such a separator may not completely remove the water from the pre-treated hydrocarbon feedstock from the hydrothermal cleaning unit or hydrothermal reactor 150 (e.g., such a separator may remove all but 1.5%, 2%, 4%, or even 6% of water from the pre-treated hydrocarbon feedstock). Further still, such a separator may take longer periods of time (e.g., hours rather than minutes) to remove the water, as such a separator may rely on time for the feedstock and water to naturally separate or settle. In one or more embodiments, the residence time within such a large Stokes' Law separator may be from 60 to 180 minutes, from 90 to 150 minutes, or even as long as 4, 5 or 6 hours.

Rather than utilizing the large separator described above, this disclosure also describes the use of a crude desalter unit and/or electrostatic precipitation unit, which despite expectations, has been discovered to efficiently remove or separate water from effluent, pre-treated hydrocarbon feedstock, or feedstock (e.g., feedstock containing high levels of metal and/or phosphorus). Typically, refineries include a crude desalter unit and/or electrostatic precipitation units, thus decreasing the need for new equipment. By increasing the amount of water (e.g., fresh water, deionized water or water fed back from the crude desalter unit or electrostatic precipitation unit) in the effluent or pre-treated hydrocarbon feedstock if the effluent or pre-treated feedstock does not include enough water, the crude desalter unit or electrostatic precipitation unit may be operated to properly remove the water from the effluent or pre-treated hydrocarbon feedstock. Further, the amount of water to be mixed with the effluent or pre-treated hydrocarbon feedstock may vary based on the type of feedstock and the amount of metal and/or salt in the hydrocarbon feedstock (for example, choice white grease may include less contaminants than packers tallow and thus require less water for removal of contamination). In another example, the amount of water in the effluent or pre-treated hydrocarbon feedstock may be sufficient for the crude desalter unit or electrostatic precipitation unit to be operated to properly remove the water from the effluent or pre-treated hydrocarbon feedstock. As used herein, effluent may refer to the liquid or pre-treated hydrocarbon feedstock output from the hydrothermal cleaning unit or hydrothermal reactor 150. Further, effluent may be used interchangeably with pre-treated hydrocarbon feedstock throughout. At the point that water and/or chemicals are added to the effluent, the effluent may be considered influent. Further, the amount of electricity utilized in a crude desalter unit and/or electrostatic precipitator may vary depending on the hydrocarbon feedstock. For example, the amount of electricity utilized may be based on the conductivity of the effluent or pre-treated hydrocarbon feedstock (e.g., the lower the conductivity of the effluent or pre-treated hydrocarbon feedstock, the larger or higher amounts of electricity which may be utilized to induce separation of water and hydrocarbon feedstock/oil). Thus, via the use of an existing crude desalter unit and/or electrostatic precipitator, more water (e.g., the contaminant-rich water) may be removed (for example, from about 1.5%, 2%, 4%, or even 6% water leftover when utilizing a large separator down to about 0.7%, 0.5% or even 0.3% of water leftover when utilizing a crude desalter unit and/or electrostatic precipitator) using less space, less time, existing refinery equipment, and a reduced cost.

Figure 2:
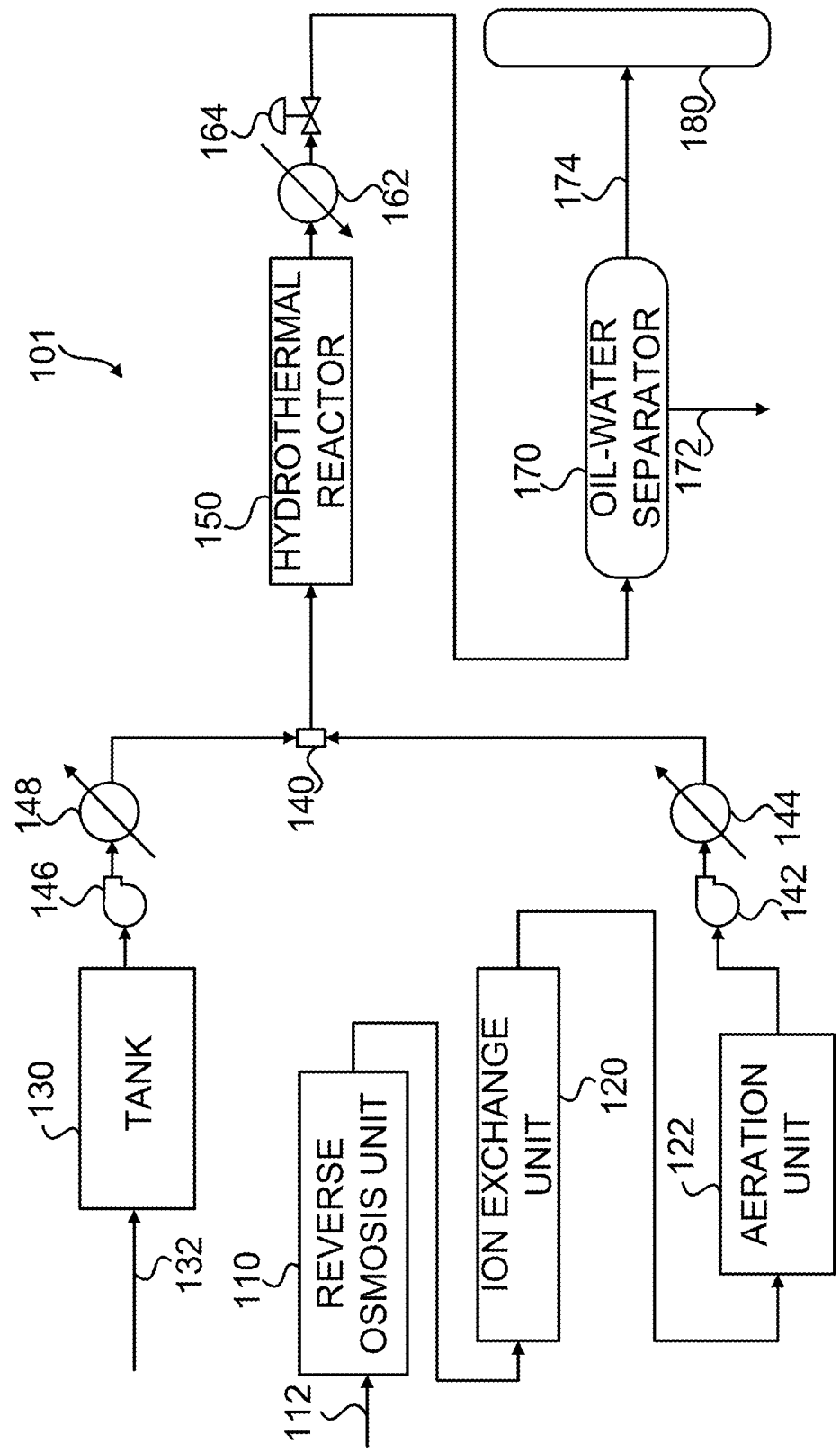

Turning now to FIG. 2, the system of enhancing the removal of metal contaminants from a hydrocarbon feedstock is similar to that shown in, and described with respect to, FIG. 1. A main difference to the system 101 of FIG. 2 is the addition of an aeration unit 122 proximate the ion exchange system. As shown, aeration unit 122 is position downstream of the ion exchange system 120 but upstream of the pump 142. The aeration unit 122 may be any industrial aeration unit known to those skilled in the art that imparts oxygen (e.g., from air) into water as dissolved oxygen. Such aeration unit 122 may be selected from various types of water fall aerators (e.g., tray aerators, forced draft aerators, etc.) and/or air diffusion aerators. A benefit of the aeration unit 122 positioned after the ion exchange system is that the air dissolved in the deionized water creates a slightly acidic deionized water due to the carbon dioxide in the air (e.g., forming carbonic acid in the deionized water). A slightly acidic deionized water may provide added benefits in liberating metals from the hydrocarbon feedstocks in reactor 150. In one or more embodiments, and as described above, a weak acid, such as citric acid, acetic acid, etc., may also be added to the deionized water prior to mixing with the hydrocarbon feedstock in mixer 140. In one or more embodiments, the aeration unit 122 is positioned upstream of the ion exchange system 120 or even upstream of the optional reverse osmosis unit 110. Because at least a portion of the dissolved oxygen (as well as carbon dioxide and other dissolved gases) added by the aeration unit passes through the semi-permeable membrane of the reverse osmosis unit 110 and is not exchanged with hydrogen or hydroxyl ions in the ion exchange resin of ion exchange system 120, the aeration unit 122 may be positioned in several locations upstream of pump 142. In one or more other embodiments (not shown), a reverse osmosis unit along with an aeration unit may be used in place of an ion exchange system, for example, to produce aerated, partially deionized water for mixing with the hydrocarbon feedstock. While a slightly acidic deionized water is beneficial, the increased concentration of dissolved oxygen may also be of benefit. As described above, dissolved oxygen is believed to contribute to a greater electrochemical reaction with the metals of the hydrocarbon feedstock in the reactor 150. Therefore, an increased concentration of dissolved oxygen in the deionized water may further increase the liberation and transfer of metals to the deionized water within the reactor.

Figure 3:
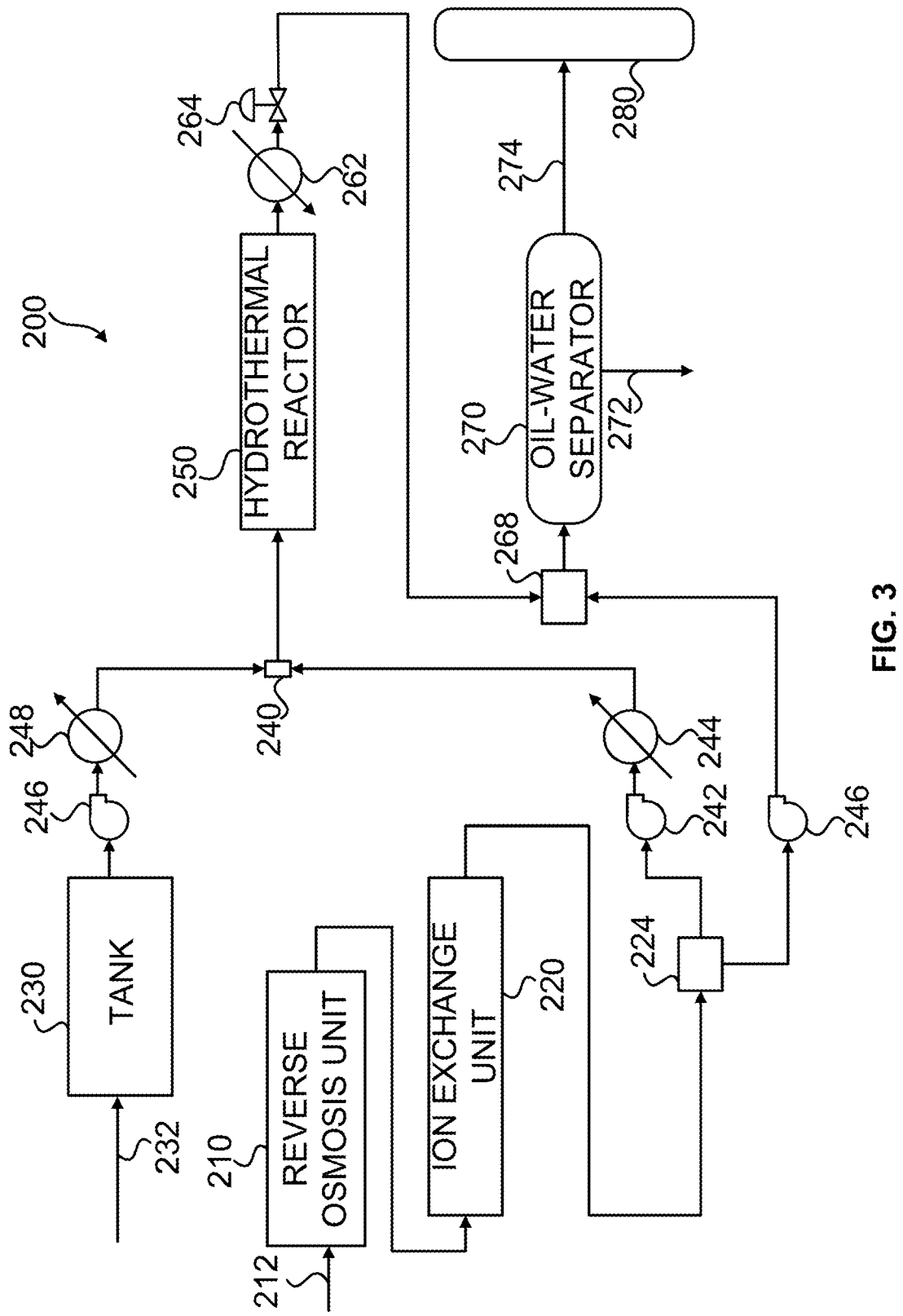
Figure 4:
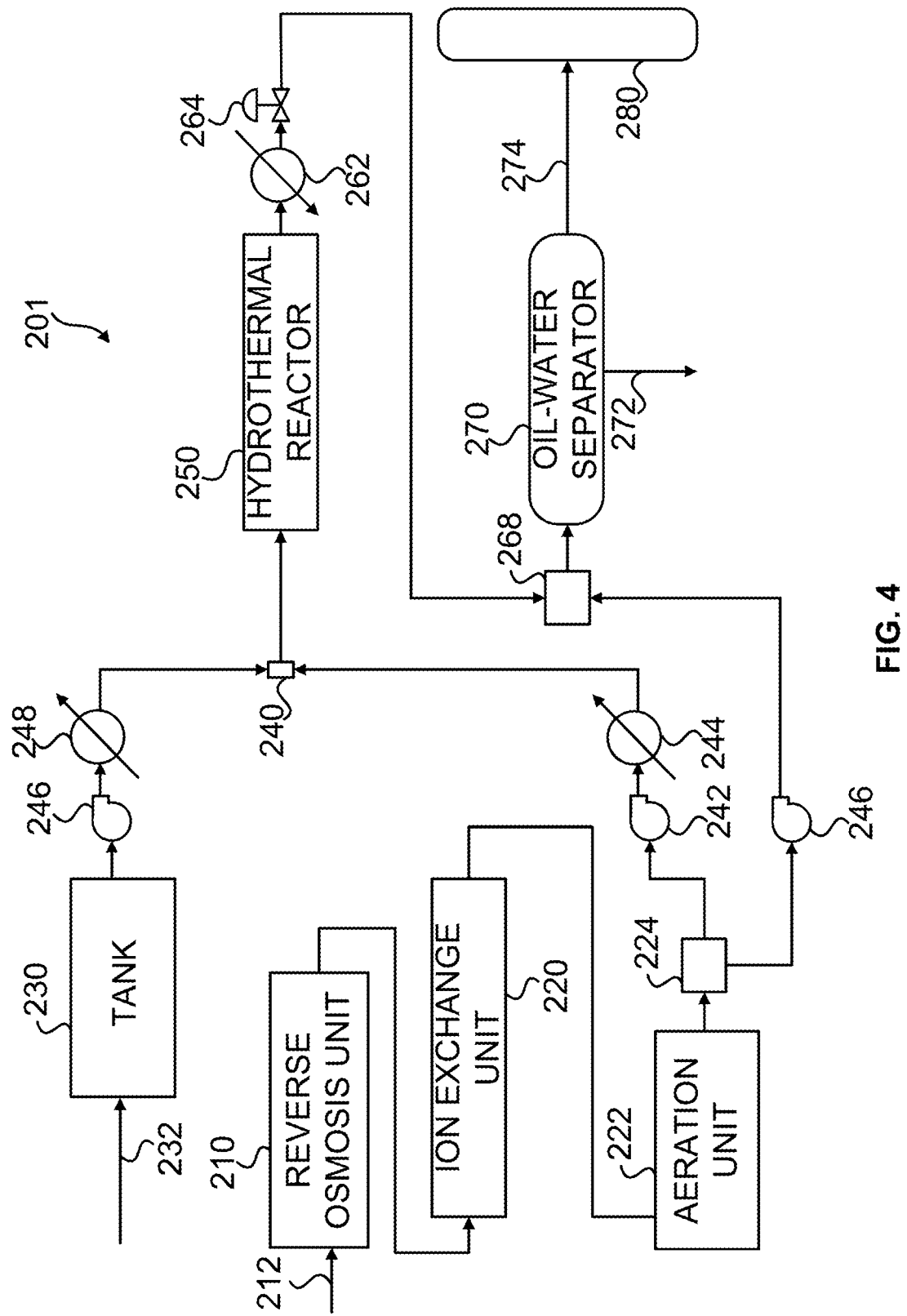

Turning now to FIG. 3, a similar system 200 to that of FIG. 1 is illustrated. Here, the last two digits of the reference numbers are intended to identify identical or similar items as in FIGS. 1 and 2. As shown in FIG. 3, a second pump 245 draws deionized water from a tank or valve 224 in fluid communication with the ion exchange system 220. Pump 245 transfers deionized water for injection at junction or flow control valve 268 into the effluent from the hydrothermal reactor 250. As noted above, the effluent from the hydrothermal reactor 250 becomes the influent to the oil-water separator 270. The addition of deionized water into this effluent/influent stream may further increase the liberation of metals from the pre-treated hydrocarbon feedstock, e.g., in the oil-water separator and/or in the piping leading thereto. Turning now to FIG. 4, a similar system 201 to that of FIG. 2 and FIG. 3 is illustrated. Here, the last two digits of the reference numbers are intended to identify identical or similar items as in FIGS. 1-3. As shown in FIG. 4, the system 201 includes an aeration unit 222 positioned between and in fluid communication with the ion exchange system 220 and the tank/valve 224. The aeration unit 222 increases the amount or concentration of dissolved air, and thus dissolved oxygen, in the deionized water that is fed to the hydrothermal reactor 250 via pump 242 and to the oil-water separator 270 via pump 245.

FIGS. 5A to 5C are schematic diagrams illustrating refinery systems for separating the hydrocarbon feedstock and deionized water mixture that flows from the hydrothermal reactor, according to embodiments of the disclosure. In FIG. 5A, the system 500 may include a flow control valve 564 that is fed by effluent stream 560. The flow control valve 564 reduces the pressure of the effluent stream 560 to the operating pressure of the oil-separator 570. The mixture of deionized water and hydrocarbon feedstock is passed to the oil-separator 570 (e.g., a Stokes' Law separator), where the deionized water along with metals and other inorganic contaminants settle to the bottom and are recovered through stream 572 for subsequent wastewater treatment. The pre-treated hydrocarbon feedstock (e.g., oils) rises to the top of the oil-separator 570, where it is skimmed and/or otherwise collected and passed to a hydroprocessing unit 580, or other downstream refinery unit/process. In FIG. 5B, heat exchanger 566 is positioned downstream of flow control valve 564 to cool (or heat) the effluent to a lower (or higher) temperature (at which point the effluent may be considered influent), before transportation to the oil-water separation unit 570. In one or more embodiments, and especially if the effluent stream is to be cooled, the heat exchanger 566 may be positioned upstream of the flow control valve 560 in order to better capture the heat transfer (versus first throttling through flow control valve 546 creating Joule-Thompson cooling). In one or more embodiments, a sensor may be disposed at the heat exchanger 566, at the flow control valve 564, and/or at some point between the flow control valve 564 and heat exchanger 566. The heat exchanger 566 may heat or cool the effluent to a specific temperature, based on the actual temperature of the effluent as measured by the sensor. For example, if the effluent is at the operating temperature of the oil-water separation unit 570 such that the water may be removed or separated from the hydrocarbon feedstock, then the heat exchanger 566 may not heat or cool the effluent, otherwise the effluent may be heated or cooled. In other words, the effluent from a hydrothermal reactor (not shown) may be sufficiently heated or cooled for use in the oil-water separation unit 570. In another example, the operating temperature of the hydrothermal reactor or hydrothermal cleaning unit may be about 465° F. to about 575° F. Further, the operating temperature of the oil-water separation unit 570 (e.g., a crude desalter unit including an electrostatic precipitator) may be about 100° F. to about 300° F. In such examples, as the effluent leaves the hydrothermal reactor or hydrothermal cleaning unit, the effluent may be at a temperature above the operating temperature of the oil-water separation unit 570. Further still, the heat exchanger 566 may cool the effluent to the operating temperature. In such examples, the heat exchanger 566 may be a fin fan cooler or another type of heat exchanger to cool liquid, as will be understood by those skilled in the art.

In FIG. 5C, the system may include a junction or flow control valve 568 to increase the amount of deionized water or chemicals added to the effluent prior to entering the oil-water separation unit 570. In another example, junction or flow control valve 568 may be a mixing valve or an in-line mixer to mix the effluent with other liquids, at which point the effluent may be considered influent. In another example, a separate in-line mixer may be disposed after junction or flow control valve 568 to mix any additional liquids with the effluent. A certain amount of deionized water in comparison to the pre-treated hydrocarbon feedstock may be further added to increase the removal of inorganic contaminants (metals and/or salt). The amount of deionized water utilized in the hydrothermal cleaning process may or may not be enough water for the oil-water separation unit 570 (e.g., an electrostatic precipitator or crude desalting process, in particular, due to the addition of other inorganic materials other than the typical salt compounds). In such examples, more deionized water may be added to the effluent at the junction or flow control valve 568, at which point the effluent may be considered influent. The deionized water may be added via pipeline or piping 565, via junction or flow control valve 567, from the same deionized water source (see FIGS. 3 and 4) used for the hydrothermal cleaning process or from a different source. Another source of water may be recycled water from the oil-water separation unit 570, which may be added at junction or flow control valve 567 via junction or flow control valve 569. The total amount of water (e.g., deionized water) used in the ratio of water to feedstock may be anywhere from about 10% to about 50% of the total (e.g., about 15% water to about 85% feedstock). In another example, the amount of water in the effluent may be sufficient for the Stokes' Law separator or electrostatic precipitation unit 570 (e.g., the effluent may include about 10% to 50% water).

In another example, the effluent may be completely emulsified. In such examples, an amount of chemicals (for example, demulsifiers or demulsifying agents) may be added to or injected into the effluent at junction or flow control valve 567, at which point the effluent may be considered influent. Small amounts of the chemicals may be added in or injected into the effluent to aid in the breaking of the emulsion. Such chemicals may include Truscent Ascent 840, Truscent Ascent 850, Baker Hughes Xeric 7010, and/or other demulsifying chemicals as will be understood by those skilled in the art. In another example, the chemicals may be mixed with water at junction or flow control valve 567 and then mixed with the effluent at junction or flow control valve 568. Upon separation of the influent, the chemicals may be contained in the water.

In FIG. 6, the system 600 is illustrated with effluent or influent (which may or may not include extra deionized or non-deionized water) flowing through the pipeline or piping 660 to flow control valve 664. The flow control valve 664 may decrease the pressure of the effluent or influent from a pre-treatment unit (e.g., a hydrothermal cleaning unit or hydrothermal reactor). The pressure in the pre-treatment cleaning unit and in the pipeline or piping 664 may be considerably higher than the operating pressure of an oil-water separation unit 670 having an electrostatic precipitator 671. For example, the pressure of the effluent or influent in piping 660 may be at about 1500 pounds-force per square inch gauge (psig), while the operating pressure of the oil-water separation unit 670 may be about 150 to about 250 psig. As such, the system may include a flow control valve 664 to lower or drop the pressure of the effluent or influent in pipeline or piping 660. The system may also include a heat exchanger 666 to heat or cool the effluent or influent, depending on the temperature of the effluent or influent and the operating temperature of the oil-water separation unit 670 housing electrostatic precipitator 671.

In another example, the oil-water separation unit 670 may include an electrostatic precipitator 671 having grid-like structure of electrodes. The electrodes may be connected to a power source 673. The power source 673 may provide power to the electrodes of the electrostatic precipitator 671 (e.g., as an alternating or direct current or a voltage). The power source 673 may be a transformer to step up a voltage from the grid or another refinery power source. For example, the transformer may connect to a 460-volt power source (e.g., from a utility company, the grid, an off grid power source, an off-grid power source dedicated to the refinery, or another refinery power source). The transformer may step the voltage up to about 20 thousand volts to 30 thousand volts, depending on the conductivity of the influent. As the influent (which may or may not include extra water and/or chemicals) is pumped into the oil-water separation unit 670, power may be provided to the electrodes of the electrostatic precipitator 671, which may create an electrostatic field within the influent. In such examples, the electrostatic field may polarize the water droplets floating in the larger volume of feedstock. The water droplets may clump together and settle near the bottom of the oil-water separation unit 670. The water may then be drained off at pipeline or piping 672. Further and as described throughout, the temperature of the liquid inside the oil-water separation unit 670 may affect the separation of the water from the feedstock. Further still, the pressure within the oil-water separation unit 670 may affect the separation of the water from the feedstock (for example, the pressure within the oil-water separation unit 670, for separation, may be about 150 psig to about 250 psig). The de-contaminated or reduced-contaminant feedstock may then be transferred, via pipeline or piping 674, to a fractional distillation column 680, a tank, to another component or equipment within a refinery, to a feed drum for further transfer of feedstock to a reactor, and/or for mixing with other de-contaminated feedstock.

In another example, the system may include several junctions or flow control valves to control the addition or injection of deionized water, non-deionized water, and/or chemicals. As noted above, the junctions or flow control valves may be mixing valves or include in-line mixers. For example, the water including the contaminants may be drained from the oil-water separation unit 670 to junction or flow control valve 669. Depending on whether water is to be recycled back through the system, the water may flow to junction or flow control valve 667 or via pipeline or piping 672 to be stored or treated. At junction or flow control valve 667, depending on various factors (e.g., how emulsified the effluent is or how much water the effluent contains), chemicals (e.g., demulsifying chemicals or agents), fresh water (deionized or non-deionized) or recycled water may be mixed and/or transported to junction or flow control valve 668 to be added into the effluent, at which point the effluent may be considered influent.

An example of an electrostatic precipitation oil-water separation unit 700 is illustrated in FIGS. 7A and 7B. In an example, the electrostatic precipitation unit 700 may include a vessel 702 or enclosure to hold influent 728 or any other type of oil/water mixture (e.g., a pre-treated feedstock which may or may not include additional water and/or chemicals). Disposed within the vessel 702 may be several layers of electrodes 704, 705, 707 (e.g., a bottom layer of electrodes 704, a middle layer of electrodes 705, and a top layer of electrodes 707). The electrodes 704, 705, 707 may connect to a transformer 706 via insulated cable 722. The insulated cable 722 may be insulated to prevent or reduce risk of electrocution, short circuit, and/or arc faults. The transformer 706 may connect to an external power source, as noted above. In other words, the transformer 706 may transfer or provide power or a high voltage (e.g., about 20 thousand to about 30 thousand volts) to the electrodes 704, 705, 707.

The electrostatic precipitation unit 700 may include various pipelines or piping to receive an influent flow and transport separated oil 720 and separated contaminant rich water 718. For example, a pipeline or piping 708 may pass through the bottom of the electrostatic precipitation unit 700 to provide an influent flow to the electrostatic precipitation unit 700. The influent flow may flow through pipeline or piping 708 to flanges 710. The flanges 710 may include apertures or openings to allow the influent 728 (e.g., the influent comprised of effluent from a hydrothermal reactor and/or including additional water and/or chemicals) to pass, flow, or spray through the to the inside of the vessel 702. The influent 728 may pass, flow, or spray through the apertures or openings and contact the electrodes 704, 705, 707. In such examples, the electrodes 704, 705, 707 may create an electrostatic field via the voltage provided by the transformer 706 via insulated cables 722. The electrostatic field created by the electrodes 704, 705, 707 may induce polarization of the contaminant rich water 718 inside the influent 728 causing the influent 728 to separate into the contaminant rich water 718 and oil 720 (e.g., the de-contaminated or reduced contaminant feedstock). The contaminant rich water 718 may then collect, clump, settle, or pool at the bottom of the vessel 702 and drain through notches, openings, or apertures 726 in pipeline or piping 716, while the separated oil 720 may pass through openings or apertures 724 in pipeline or piping 712. In an example, the process of separating the oil 720 (e.g., feedstock) from the contaminant rich water 718 in the influent 728 may be performed in about 10 minutes to about 60 minutes. The pipeline or piping 712 may transport the oil 720 to other refinery processes and/or equipment. The pipeline or piping 716 may transport the contaminant rich water 718 to a junction or flow control valve for re-use in the electrostatic precipitation unit 700 or in other refinery processes or for treatment at a wastewater treatment unit or facility (e.g., at or separate from the refinery).

Figure 8:
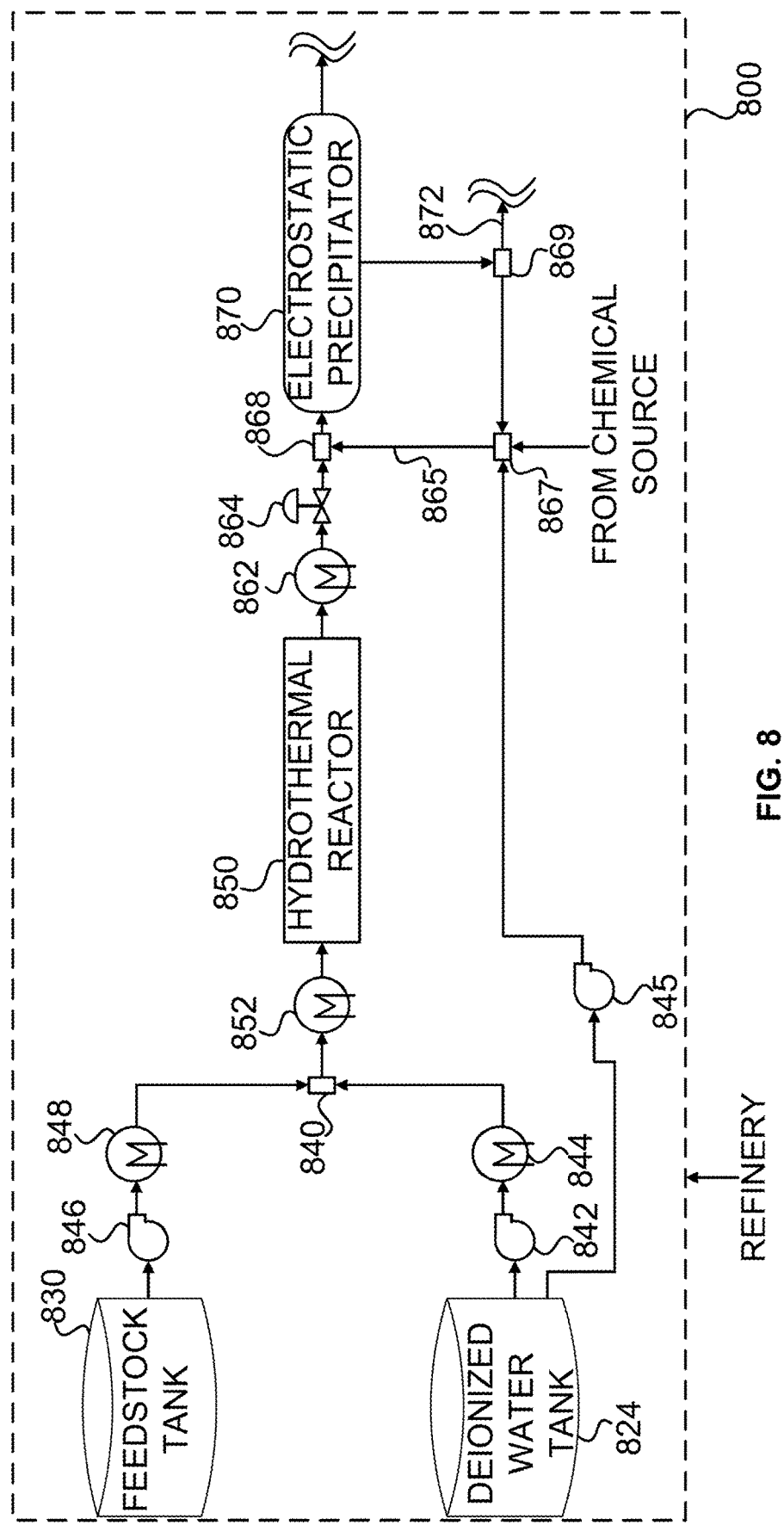

In FIG. 8, the system 800 may include two or more tanks. The system 800 may include a feedstock tank 830 (or other source of feedstock), a water tank 824 (or other water source), other tanks to store other feedstock and/or additional water, and/or connections to feedstock and/or water sources (e.g., deionized water sources). The system may further include a connection to another water source.

Each tank may connect to a pump 842, 845, 846 and/or a heat exchanger 844, 848. The pumps 842, 846 may increase the pressure of the feedstock and/or water to the operating pressure of the hydrothermal reactor 850. In another example, the water may be injected into the feedstock (for example, at junction or flow control valve 840) and then passed to a pump (not shown) and/or heat exchanger 852. In such examples, the mixed or blended feedstock and water (e.g., deionized water), the feedstock, and/or the deionized water may be heated, via the heat exchanger 844, 848, 852 to a temperature sufficient for the water to absorb the metals, phosphorous, and/or other contaminants. In such examples, the blend or each portion of the blend (i.e., the water and/or feedstock) may be heated to about 465° F. to about 575° F.

In another example, the heated hydrocarbon feedstock and deionized water mixture may be passed to the hydrothermal reactor 850. In such examples, the hydrothermal reactor 850 may have one or more long tube-like structures to provide sufficient residence time (e.g., about 30 seconds to 5 minutes) at the sufficient temperature to wash the contaminants from the hydrocarbon feedstock into the deionized water. In an example, such a process may utilize about 10% to about 50% water (the amount of water relative to the total amount of water and feedstock). For example, to process approximately 40 thousand barrels of oil per day (MBD) of feedstock the hydrothermal reactor 850 may utilize approximately 12 MBD of deionized water or 350 gallons per minute (GPM) of deionized water.

Once the contaminants have been washed from the hydrocarbon feedstock into the deionized water, the feedstock and water mixture may be transported to a heat exchanger 862 to reduce the temperature of the mixture (based on the temperature of the mixture entering the heat exchanger 862). Downstream of the heat exchanger 862, the mixture passes through a flow control valve 864 to decrease the pressure of the mixture. From the flow control valve, the mixture may be transported to the electrostatic precipitation unit 870. In another example, the amount of deionized water in the blend or mix of hydrocarbon feedstock and deionized water may not include an amount of water sufficient to separate the water from the feedstock via the electrostatic precipitation unit 870. In such examples, extra or additional fresh water (e.g., deionized water) from the deionized water tank 824 may be added from deionized water tank 824, via pump 845 and via junctions or flow control valves 867, 868, to the mixture/influent. In one or more embodiments, recycled water drained from the electrostatic precipitation unit 870 may be added to the mixture/influent via junctions or flow control valves 867, 868, 869. The mixture or combined mixture and additional water may be transported to the electrostatic precipitation unit 870, where all or most of the water (for example, all but about 0.7%, about 0.5% or even about 0.3% of the water) may be separated in a short period of time (e.g., about 10 minutes to about 60 minutes). The water containing the contaminants may be transported, via pipeline or piping 872 from the electrostatic precipitation unit 870, while the feedstock may be transported to a tank, a refinery process or component, a fractional distillation column, to a point where the pre-treated hydrocarbon feedstock may be combined with another feedstock, to a feed drum for further transfer of pre-treated hydrocarbon feedstock to a reactor, and/or other points or locations within or external to the refinery, e.g., for processing through various refinery operations.

Figure 9:
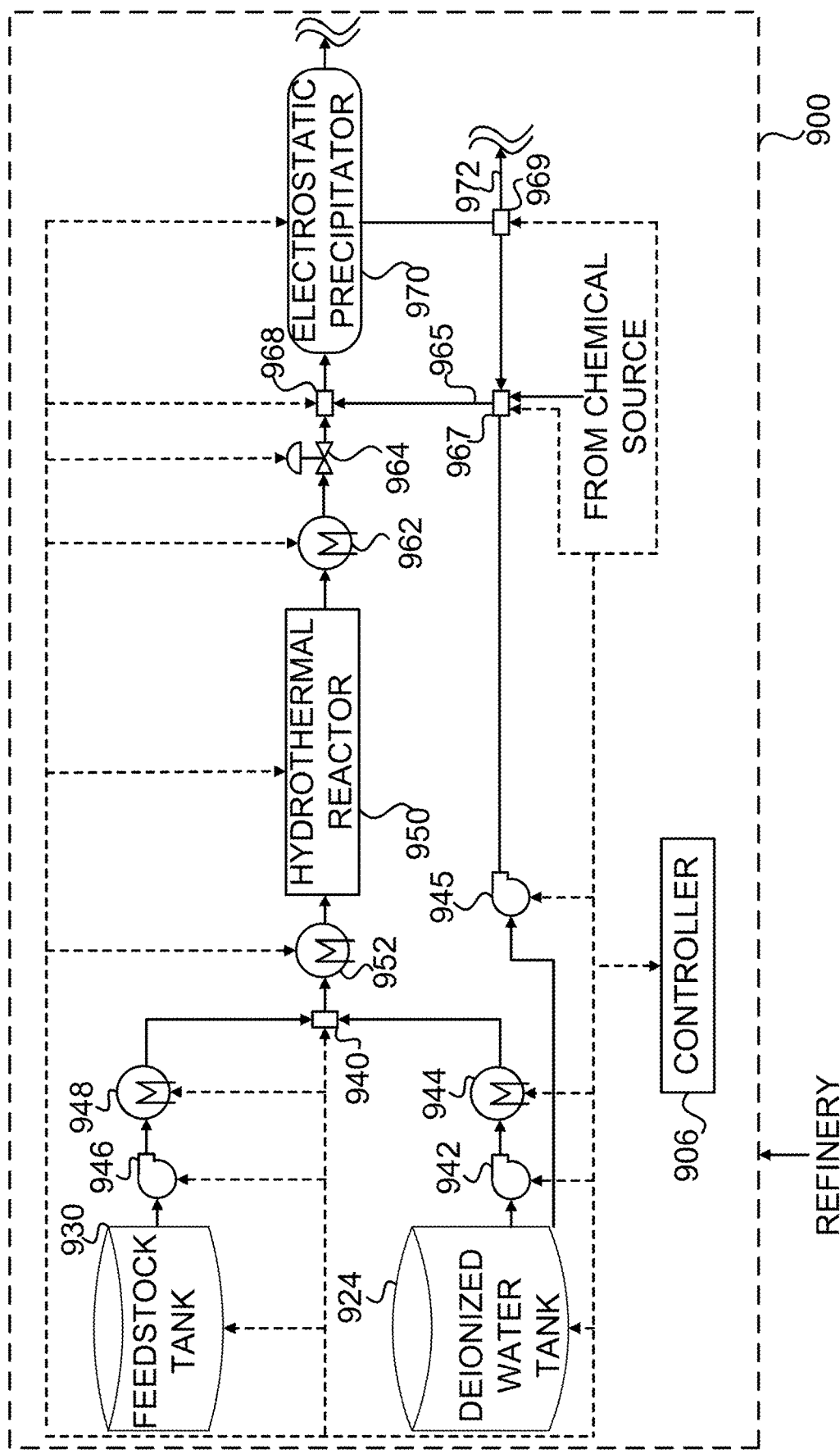

As illustrated in FIG. 9, the system 900 may include a controller 906. The controller 906 may connect to or be in signal communication with various different sensors, other controllers, meters, or components in the refinery. In another example, the controller 906 may be a refinery controller and may include instructions, in addition to the instructions described below, to control various refinery processes and/or equipment. The controller 906 may include memory and one or more processors. The memory may store instructions executable by the one or more processors. In an example, the memory may be a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory may store or include instructions executable by a processor. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

In such examples, the controller 906 may determine whether to and/or to what temperature the hydrocarbon feedstock, deionized water, and/or effluent may be heated or cooled. The controller 906 may make such determinations based on the type of feedstock, the initial temperature of the hydrocarbon feedstock, the initial temperature of the deionized water, the temperature of the effluent exiting the hydrothermal reactor 950, and/or the temperature of deionized or other water to be added to the effluent, e.g., via pump 945. Such data may be provided via sensors disposed throughout the system 900, as shown. Similarly, controller 906 may determine to what pressure the hydrocarbon feedstock, deionized water, and/or effluent are to be pressurized to or depressurized from via pumps 942, 946 and flow control valve (e.g., letdown valve) 964, respectively. The controller 906 may make determinations as to what pressure to elevate the hydrocarbon feedstock and deionized water, and to operate the hydrothermal reactor 950, based on, e.g., the amount of contaminants in the contaminant-rich renewable hydrocarbon feedstock.

In another example, the controller 906 may determine the amount of deionized or other water to add via pump 945 to the effluent from the hydrothermal reactor 950 based on the amount of effluent from the hydrothermal reactor 950 and the amount of deionized water initially added to the hydrocarbon feedstock at junction or flow control valve 940. The controller 906 may further determine the length of time or residence time (in other words, the time interval) that the combined water and feedstock may reside in the hydrothermal reactor 950 and the length of time or residence time (in other words, the time interval) that the influent (with or without extra water) may reside in the electrostatic precipitation unit 970. Further, the controller 906 may determine the temperature at which the combined water and feedstock may be heated to while residing in the hydrothermal reactor 950 and the temperature at which the effluent may be heated or cooled to prior to entering the electrostatic precipitation unit 970. Likewise, the controller 906 may determine the pressure at which the combined water and feedstock may be elevated to (e.g., by pumps 942, 946) in the hydrothermal reactor 950. One or more pressure sensors (not shown) may be disposed within the piping between the pumps 942, 946 and the hydrothermal reactor 950, and within the hydrothermal reactor 950 itself, to ensure that the pressure has been adequately elevated. The controller 906 may also determine the pressure to which the effluent should be lowered prior to entering the electrostatic precipitation unit 970, as further described below.

The controller 906 may determine the pressure drop for the effluent entering the electrostatic precipitation unit 970. The effluent exiting the hydrothermal reactor 950 may be at a pressure greater than the operating pressure of the electrostatic precipitation unit 970. As such, the controller 906 may determine adjustments for the flow control valve 964 to lower or drop the pressure of the effluent to within a range of operating pressures of the electrostatic precipitation unit 9704. In an example, a pressure sensor may be disposed at the output of the hydrothermal reactor 950, at the flow control valve 964, or at some point in between. The pressure sensor may provide the pressure of the effluent to the controller 906. The controller 906 may utilize such data to adjust the flow control valve 964, thus adjusting the pressure to within the proper range of the operating pressure of the electrostatic precipitation unit 970.

Figure 10:
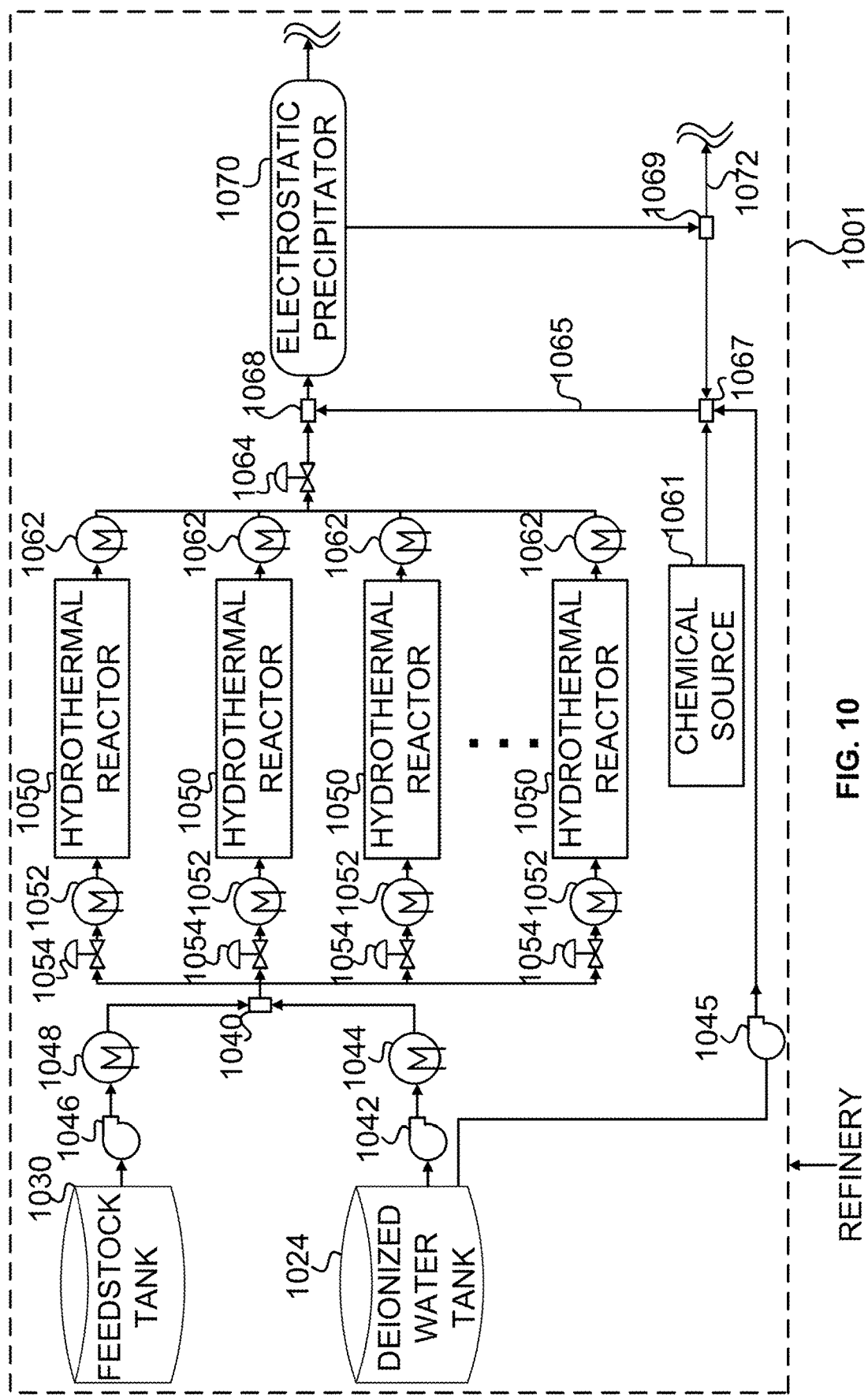

As illustrated in FIG. 10, multiple hydrothermal reactors 1050 may be utilized in parallel. In such examples, flow control valves 1054 may enable which hydrothermal reactor 1050 may be utilized at any particular time. For example, one hydrothermal reactor 1050 may be utilized for a first process, while another may be utilized for a following process. In another example, several hydrothermal reactors 1050 may be taken offline for maintenance, while the rest may be utilized for further processes during such maintenance.

As noted above, demulsifying agents may be utilized in an electrostatic precipitation unit 1070. Such demulsifying agents may be from a chemical source 1061. The chemical source 1061 may be a tank storing the demulsifying agents or another type of storage to store such demulsifying agents, as will be understood by those skilled in the art.

Figure 11:
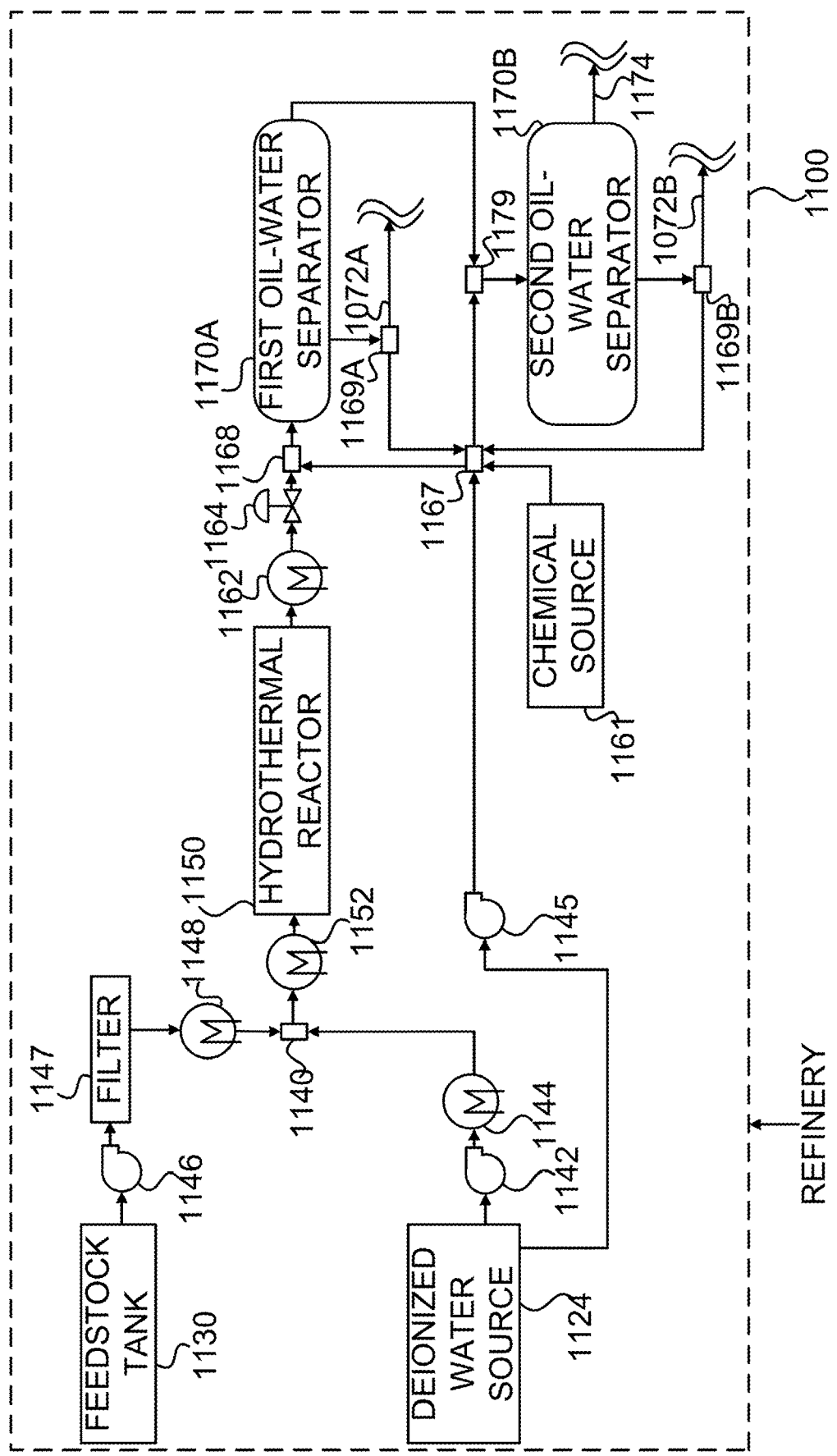

As illustrated in FIG. 11, system 1100 may include one or more oil-water separators (e.g., a crude desalter unit utilizing demulsifying agents, a crude desalter unit utilizing an electrostatic precipitator, an electrostatic precipitation unit, an oil-water separator including an electrostatic precipitator, or other type of separator). Rather than using the large separator as described above, a smaller first oil-water separator 1170A (e.g., a small Stokes Law separator, a crude desalter unit utilizing demulsifying agents, a crude desalter unit utilizing an electrostatic precipitator, an electrostatic precipitation unit, an oil-water separator including an electrostatic precipitator, or other type of separator) may be utilized in conjunction with and/or in series with the second oil-water separator 1170B (e.g., a crude desalter unit utilizing demulsifying agents, a crude desalter unit utilizing an electrostatic precipitator, an electrostatic precipitation unit, an oil-water separator including an electrostatic precipitator, or other type of separator). For example, as described above, a feedstock source 1130, such as a storage tank, may be a renewable feedstock or other feedstock including contaminants (e.g., metal, phosphorus, and/or other contaminants). Feedstock from the feedstock source 1130 may be mixed with deionized water from a deionized water source 1124, such as a holding tank. The water used to generate the deionized water (via an ion exchange system) may be obtained from, e.g., a tank, pond, utility provider (via pipeline or piping), and/or other location including fresh water.

Prior to heating via heat exchanger 1148, the hydrocarbon feedstock may pass through an optional filter 1147. The filter 1147 may filter out any solids in the hydrocarbon feedstock from the feedstock source 1130. In such examples, the filter 1147 may be a mesh filter, a basket filter, or another type of filter suitable for removing solids from a liquid as will be understood by those skilled in the art. For example, the hydrocarbon feedstock may pass through a mesh filter prior to entering the pump 1146 or the heat exchanger 1148. The mesh filter may be a 5-micron to 50-micron mesh filter (e.g., filter 1147 may be a 10-micron mesh filter). The feedstock source 1130 and/or deionized water source 1124 may be heated prior to mixing, via heat exchanger 1148 and/or heat exchanger 1144, respectively, or may be heated after mixing via, heat exchanger 1152. In another example, the mixture may be heated in the hydrothermal reactor 1150. The heated mixture may undergo a hydrothermal reaction within the hydrothermal reactor 1150, based on the temperature, pressure, flow, and/or residence time in the hydrothermal reactor 1150, to wash the inorganic contaminants from the hydrocarbon feedstock into the deionized water.

Once the mixture has undergone the hydrothermal reaction, the mixture may be transported to the first oil-water separator 1170A. As noted, the first oil-water separator 1170A may be a Stokes' law separator, a crude desalter unit utilizing demulsifying agents, a crude desalter unit utilizing an electrostatic precipitator, an electrostatic precipitation unit, an oil-water separator including an electrostatic precipitator, or other type of separator. In an example, the separator 1170A may be a tank to store the mixture for a period of time. During the period of time, the oil or feedstock may separate and a skimmer may separate and transport the oil to junction or flow control valve 1179. The remaining water may be drained and/or transported via pipeline or piping 1072A for disposal, re-use, or treatment or the remaining water may be transported for re-use at junction or flow control valve 1167. In such examples, the hydrocarbon feedstock, after undergoing the hydrothermal reaction, may still include about 1.5%, 2%, about 4%, or even about 6% of water (e.g., contaminant-rich water).

The hydrocarbon feedstock from the first oil-water separator 1170A may be transported to junction or flow control valve 1179. At junction or flow control valve 1179, additional water (e.g., deionized water from water source 1124 via pump 1146, recycled water from the first oil-water separator 1170A, and/or second oil-water separator 1170B) and/or chemicals (e.g., demulsifying chemicals) from chemical source 1161 may be mixed with the hydrocarbon feedstock. In such examples, the amount of water added may be about 1% to about 10% of the total of the mixture of the additional water and the feedstock (i.e., the feedstock which may still include about 1.5%, 2%, about 4%, or even about 6% of contaminant-rich water after passing through the first oil-water separator 1170A).

During the residence time that the mixture is in the first oil-water separator 1170A, the mixture may cool. As such, another heat exchanger (not shown) may be disposed in the system 1100 to heat or cool the feedstock transported from the first oil-water separator 1170A, to heat or cool the additional deionized or other water, and/or to heat the mixture of the additional water and the hydrocarbon feedstock from the first oil-water separator 1170A prior to entering the second oil-water separator 1170B.

Once the new mixture of feedstock and additional water have been heated or cooled to a selected temperature (e.g., for a crude desalter unit about 100° F. to about 300° F.), the new mixture may be transported to the second oil-water separator 1170B (e.g., a secondary oil-water separator unit and/or a crude desalter unit). In the second oil-water separator 1170B, all or a substantial portion of the water may be removed from the mixture. For example, all but about 0.7%, about 0.5% or even about 0.3% of the water may be removed from the mixture. The water removed may include the contaminants or a portion of the contaminants leftover from the first oil-water separator 1170A. The water may be transported from the second oil-water separator 1170B via pipeline or piping 1172B disposal, re-use, or treatment or via junction or flow control valve 1169B for re-use in the first oil-water separator 1170A and/or second oil water separator 1170B. The pre-treated hydrocarbon feedstock, which may be free of or substantially free of contaminants, i.e., a reduced-contaminant feedstock, may be transported via pipeline or piping 1174 to various downstream refinery equipment, such as one or more hydroprocessing units, a fractionation column, and/or distillation tower.

FIG. 12 is a simplified diagram illustrating a control system or system 1200 for managing the removal of inorganic contaminants, including metals, from a renewable hydrocarbon feedstock, according to an embodiment of the disclosure. As noted above, the controller 1200 may include memory 1206 and a processor 1204 (or one or more processors). The memory 1206 may store instructions and the instructions may be executable by the processor 1204. The instructions may include instructions 1208 to control the various valves, flow control valves, or other components (e.g., water control valve 1218 and/or feedstock control valve 1220) to control or adjust ratios and/or pressure of water and feedstock transported to a hydrothermal cleaning unit 1232 (also referred to as a HCU or hydrothermal reactor). The controller 1202 may also control the amount of water to mix with effluent from the hydrothermal cleaning unit. The controller 1202 may also connect to and control an effluent flow control valve disposed between an HCU and electrostatic precipitation unit. The controller 1202 may determine the pressure of the effluent and, based on the pressure of the effluent and the operating pressure of the electrostatic precipitator, the controller 1202 may lower the pressure via the effluent flow control valve.

The controller 1202 may also include instructions 1210 to control pumps disposed throughout the system 1200. For example, the system 1200 may include a water pump 1222 to control, via signals from the controller 1202, the flow of water throughout the system 1200 and/or a feedstock pump 1224 to control, via signals from the controller 1202, the flow of feedstock throughout the system 1200. In such examples, the controller 1202 may determine the amount of water to mix with feedstock and/or the amount of water to mix with effluent from the hydrothermal cleaning unit, based on various factors, such as type of feedstock, estimated or actual amount of contaminants in the effluent, operating temperature, and/or operating power.

The controller 1202 may also include instructions 1212 to control heat exchangers disposed throughout the system 1200. For example, the system 1200 may include a feedstock heat exchanger 1226, a water heat exchanger 1228, and/or an effluent heat exchanger 1230. The controller 1202 may control each of the heat exchangers based on the operating temperature for each process in the system 1200. For example, the hydrothermal cleaning unit 1232 may operate at temperatures between 465° F. and 575° F. Thus the controller 1202 may determine (for example, via sensors or other devices disposed throughout the system 1200) the temperature of a liquid, and based on the process to be performed and an operating temperature, may send a signal to a heat exchanger to heat the liquid to the proper temperature. In other examples, the system 1200 may or may not include an effluent heat exchanger 1230. In such examples, the effluent may be heated or cooled to a sufficient level as the effluent is transported from the hydrothermal cleaning unit 1232.

The controller 1202 may include instructions 1214 to control the hydrothermal cleaning unit 1232 and instructions 1216 to control the electrostatic precipitation unit 1234. For example, the controller 1202 may determine the amount of time a blend of feedstock and water may reside in the hydrothermal cleaning unit 1232 and/or in an electrostatic precipitation unit 1234. In another example, the controller 1202 may determine the length of time a liquid may reside in the hydrothermal cleaning unit 1232 and/or electrostatic precipitation unit 1234.

FIG. 13 is a flow diagram, implemented in a controller, for managing the separation of deionized water from a pretreated hydrocarbon feedstock, according to an embodiment. The method is detailed with reference to system 800 of FIG. 8. Unless otherwise specified, the actions of method 1300 may be completed within the controller 906 (FIG. 9). Specifically, method 1300 may be included in one or more programs, protocols, or instructions loaded into the memory of the controller 906 and executed on the processor or one or more processors of the controller 906. The order in which the operations are described is not intended to be construed as a limitation, and any number of the described blocks may be combined in any order and/or in parallel to implement the methods.

At block 1302, the process may be initiated. In an example, a user may start the process at a user interface connected to the controller 906. At block 1304, in response to an initiation signal, the controller 906 may determine a temperature to heat the hydrocarbon feedstock to and send a signal to heat the hydrocarbon feedstock, from a feedstock tank 830 (or other source of feedstock), via a heat exchanger 848. At block 1306, the controller 906 may determine a temperature to heat the deionized water to and send a signal to heat the deionized water, from a deionized water tank 824 (or other deionized water source), via a heat exchanger 844. In another example, rather than (or in addition to) heating the hydrocarbon feedstock and/or deionized water prior to mixing, the controller 906 may send a signal to heat exchanger 852 to heat the combination or mixture of the deionized water and hydrocarbon feedstock.

At block 1310, the hydrocarbon feedstock may be mixed with water at junction or flow control valve 840. The controller 906 may determine the amount of deionized water to mix with the hydrocarbon feedstock based on the type of feedstock and/or the amount of feedstock to be processed. At block 1312, the mixture of the deionized water and hydrocarbon feedstock may be transported to the hydrothermal reactor 850 for washing the hydrocarbon feedstock, under elevated temperature, pressure and at non-laminar flow, to remove inorganic contaminants. After the mixture or blend has resided in the hydrothermal reactor 850 for a sufficient amount or period of time, at block 1316, the controller 906 may determine (for example, via a sensor) whether the effluent is at a sufficient or correct temperature and/or pressure for processing at the oil-water separation unit 870 (e.g., an electrostatic precipitation unit). If the effluent is not at the correct pressure, the flow control valve 864 may let down the pressure of the effluent. If the effluent is not the correct temperature, at block 1318, the heat exchanger 862 may heat or cool the effluent to the proper temperature. Once the effluent is at the proper temperature, at block 1320, the controller 906 may determine whether the amount of deionized water contained in the effluent is sufficient. If the amount of deionized water is not sufficient, at block 1322, additional water may be added to, injected into the stream of, and/or incorporated with the effluent, at which point the effluent may be considered influent.

Once the influent has the proper or correct amount of water and is at the proper or correct temperature and/or pressure, the influent, at block 1324, may be transported to the electrostatic precipitation unit 870. The influent may reside in the crude desalter unit, housing the electrostatic precipitation unit, for a specified amount of time, at a specified temperature, and at a specified pressure. Further, a specified amount of power may be applied to create an electrostatic field within the electrostatic precipitation unit 870, thus, separating, at block 1326, the contaminant-rich water from the feedstock.

This application is a continuation of U.S. Non-Provisional application Ser. No. 17/687,661, filed Mar. 6, 2022, titled "SYSTEMS AND METHODS FOR ENHANCED INORGANIC CONTAMINANT REMOVAL FROM HYDROCARBON FEEDSTOCK," which is a continuation of U.S. Non-Provisional application Ser. No. 17/452,678, filed Oct. 28, 2021, titled "SYSTEMS AND METHODS FOR ENHANCED INORGANIC CONTAMINANT REMOVAL FROM HYDROCARBON FEEDSTOCK," now U.S. Pat. No. 11,306,260, issued Apr. 19, 2022, which claims priority to and the benefit of U.S. Provisional Application No. 63/198,606, filed Oct. 29, 2020, titled "REFINERY SYSTEMS AND METHODS FOR SEPARATING WATER FROM PRE-TREATED FEEDSTOCK," U.S. Provisional Application No. 63/198,937, filed Nov. 24, 2020, titled "REFINERY SYSTEMS AND METHODS FOR SEPARATING WATER AND REMOVING SOLIDS FROM PRE-TREATED AND UNFILTERED FEEDSTOCK," and U.S. Provisional Application No. 63/198,960, filed Nov. 25, 2020, titled "SYSTEMS AND METHODS FOR ENHANCED INORGANIC CONTAMINANT REMOVAL FROM HYDROCARBON FEEDSTOCK," the disclosures of which are incorporated herein by reference in their entirety.

In the drawings and specification, several embodiments of systems and methods to enhance the removal of inorganic contaminants, and particularly metals, from a hydrocarbon feedstock have been disclosed, and although specific terms are employed, the terms are used in a descriptive sense only and not for purposes of limitation. Several embodiments of systems and methods have been described in considerable detail and with specific reference to the drawings. However, it will be apparent that various modifications and changes may be made within the spirit and scope of the embodiments of systems and methods as described in the foregoing specification, and such modifications and changes are to be considered equivalents and part of this disclosure.

The invention claimed is:

1. A process for reducing contaminants in renewable hydrocarbon feedstocks at a refinery, the process comprising:
    passing deionized water through an aerator, thereby to increase a concentration of dissolved oxygen in the deionized water;
    mixing the deionized water with a renewable feedstock having hydrocarbon compounds and inorganic contaminants, thereby to create a deionized water and renewable feedstock mixture;
    reacting the deionized water and renewable feedstock mixture at a temperature, pressure and non-laminar flow so as to inhibit rearrangement reactions of the renewable feedstock hydrocarbon compounds;
    maintaining the temperature, pressure and non-laminar flow for a first interval of time so as to transfer at least a portion of the inorganic contaminants of the renewable feedstock into the deionized water;
    after the first time interval, and for a second time interval, separating the deionized water containing the inorganic contaminants from the renewable feedstock, thereby to create contaminant-rich water and a reduced-contaminant renewable feedstock; and
    after the second time interval, passing the reduced-contaminant renewable feedstock to a downstream refinery process.

2. The process of claim 1, further comprising removing inorganic contaminants from untreated water, thereby to generate water for passing to be ion exchanged and thereby generate the deionized water.

3. The process of claim 1, wherein the deionized water comprises greater than 15% by volume of the deionized water and renewable feedstock mixture, and wherein the non-laminar flow has a Reynolds number greater than 2,000.

4. The process of claim 1, wherein the deionized water comprises greater than 30% by volume of the deionized water and renewable feedstock mixture.

5. The process of claim 1, wherein the deionized water comprises between about 10% to about 50% by volume of the deionized water and renewable feedstock mixture.

6. The process of claim 1, wherein the first time interval comprises a time interval between about 30 seconds to about 5 minutes.

7. The process of claim 1, wherein the temperature comprises a temperature between about 200° C. and about 450° C.

8. The process of claim 1, wherein the renewable feedstock includes (a) one or more of plant oils, algal and microbial oils, waste vegetable oils, yellow and brown grease, tallow, soap stock, pyrolysis oils from plastic or cellulose, and (b) petroleum fractions.

9. The process of claim 1, further comprising, prior to the step of separating the deionized water containing the inorganic contaminants from the renewable feedstock, injecting additional deionized water into the deionized water and renewable feedstock mixture.

10. The process of claim 9, wherein an amount of the additional deionized water comprises between about 3% to about 10% by volume of the deionized water and renewable feedstock mixture.

11. The process of claim 1, wherein the second time interval comprises a time period between 60 minutes and 180 minutes.

12. The process of claim 1, wherein the pressure comprises a pressure between about 500 psig and about 6,000 psig.

13. The process of claim 1, wherein the deionized water in the deionized water and renewable feedstock mixture becomes less deionized as metal inorganic containments are transferred therein.

14. The process of claim 1, wherein the conductivity of the deionized water comprises a conductivity less than about 1 $\mu$S/cm.

15. A process for reducing contaminants in renewable hydrocarbon feedstocks at a refinery, the process comprising:
    generating deionized water;
    aerating the deionized water in an aerating unit, thereby to generate an aerated, deionized water;
    injecting the aerated, deionized water into a renewable feedstock stream at a refinery, thereby to create a mixture of aerated, deionized water and renewable feedstock;
    passing the mixture into a reactor at a pre-selected temperature, pressure and non-laminar flow;
    maintaining the temperature, pressure and non-laminar flow of the reactor for a first interval of time, thereby to transfer at least a portion of inorganic contaminants of the renewable feedstock into the aerated, deionized water;
    after the first time interval, passing the mixture to a separation unit of the refinery;
    separating the aerated, deionized water containing the inorganic contaminants from the renewable feedstock in the separation unit so as to create contaminant-rich water and a reduced-contaminant renewable feedstock for a second time interval; and
    after the second time interval, passing the reduced-contaminant renewable feedstock to a downstream refinery process.

16. The process of claim 15, further comprising passing untreated water through a reverse osmosis unit to remove inorganic contaminants therefrom, thereby to generate water to be deionized.

17. The process of claim 16, wherein the deionized water has a conductivity less than about 5 $\mu$S/cm, wherein the deionized water comprises between about 10% to about 50% by volume of the deionized water and renewable feedstock mixture, and wherein the non-laminar flow has a Reynolds number greater than 2,000.

18. The process of claim 15, wherein the temperature comprises a temperature between about 200° C. and about 450° C. and the pressure comprises a pressure between about 500 psig and about 6,000 psig, and wherein the deionized water has a conductivity less than about 5 $\mu$S/cm.

19. The process of claim 15, wherein the renewable feedstock includes (a) one or more of plant oils, algal and microbial oils, waste vegetable oils, yellow, white and brown grease, fish oil, tallow, soap stock, pyrolysis oils from plastic or cellulose, and (b) petroleum fractions, and wherein the deionized water has a conductivity less than about 5 µS/cm.

20. The process of claim 15, further comprising prior to passing the aerated deionized water and renewable feedstock mixture to the separation unit, injecting additional aerated deionized water into the aerated deionized water and renewable feedstock mixture, and wherein the deionized water has a conductivity less than about 5 µS/cm.

21. The process of claim 20, wherein an amount of the additional deionized water comprises between about 3% to about 10% by volume of the deionized water and renewable feedstock mixture.

22. The process of claim 15, wherein the conductivity of the deionized water comprises a conductivity less than about 1 µS/cm.

23. The process of claim 15, further comprising adding an acid to the aerated, deionized water prior to injecting the aerated, deionized water into the renewable feedstock stream.

24. A refinery system for reducing contaminants in renewable hydrocarbon feedstocks, the system comprising:
- a source of a renewable feedstock having hydrocarbons compounds and inorganic contaminants;
- a source of water;
- a deionized water generator in fluid communication with the source of water, the deionized water generator operating to generate a stream of deionized water having a conductivity less than a selected threshold;
- a mixer in fluid communication with the source of renewable feedstock and in fluid communication with the deionized water stream, the mixer configured to receive the deionized water stream and renewable feedstock stream so as to create a mixture of deionized water and renewable feedstock;
- an aeration unit configured to aerate at least one of the water from the water source or the deionized water from deionized water stream prior to being received by the mixer;
- a cleaning unit, positioned at a refinery, in fluid communication with the mixer to receive the mixture, the cleaning unit configured to transfer inorganic contaminants contained in the renewable feedstock into the deionized water during a first time interval;
- an oil-water separator, at the refinery and in fluid communication with the cleaning unit, the oil-water separator receiving the mixture from the cleaning unit and providing a residence time to separate the renewable feedstock from the deionized water containing the inorganic contaminants, thereby to generate a reduced-contaminant renewable feedstock to be provided to a refinery process unit.

25. The system of claim 24, further comprising piping configured to inject additional deionized water into the mixture of deionized water and renewable feedstock at a location between the hydrothermal reactor and the oil-water separator.

26. A process for reducing contaminants in renewable hydrocarbon feedstocks at a refinery, the process comprising:
- mixing deionized water with a renewable feedstock having hydrocarbon compounds and inorganic contaminants, thereby to create a deionized water and renewable feedstock mixture, the deionized water having a conductivity less than a selected threshold;
- reacting the deionized water and renewable feedstock mixture in a reactor at a temperature, pressure and non-laminar flow;
- maintaining the temperature, pressure and non-laminar flow of the reactor for a first interval of time, thereby to transfer at least a portion of the inorganic contaminants of the renewable feedstock into the deionized water;
- after the first time interval, and for a second time interval, separating the deionized water containing the inorganic contaminants from the renewable feedstock, thereby to create contaminant-rich water and a reduced-contaminant renewable feedstock; and
- after the second time interval, passing the reduced-contaminant renewable feedstock to a refinery process.

27. The process of claim 26, wherein the selected threshold comprises about 5 µS/cm, and wherein the non-laminar flow has a Reynolds number greater than 2,000.

* * * * *